(12) United States Patent
Rosewarne et al.

(10) Patent No.: US 9,854,241 B2
(45) Date of Patent: Dec. 26, 2017

(54) METHOD, APPARATUS AND SYSTEM FOR ENCODING AND DECODING THE TRANSFORM UNITS OF A CODING UNIT

(71) Applicants: Christopher James Rosewarne, Gosford (AU); Volodymyr Kolesnikov, Marsfield (AU)

(72) Inventors: Christopher James Rosewarne, Gosford (AU); Volodymyr Kolesnikov, Marsfield (AU)

(73) Assignee: Canon Kabushiki Kaisha, Tokyo (JP)

( * ) Notice: Subject to any disclaimer, the term of this patent is extended or adjusted under 35 U.S.C. 154(b) by 217 days.

(21) Appl. No.: 14/431,724

(22) PCT Filed: Sep. 27, 2013

(86) PCT No.: PCT/AU2013/001116
§ 371 (c)(1),
(2) Date: Mar. 26, 2015

(87) PCT Pub. No.: WO2014/047693
PCT Pub. Date: Apr. 3, 2014

(65) Prior Publication Data
US 2015/0249828 A1    Sep. 3, 2015

(30) Foreign Application Priority Data

Sep. 28, 2012 (AU) ................................ 2012232992

(51) Int. Cl.
*H04N 7/12* (2006.01)
*H04N 19/122* (2014.01)
(Continued)

(52) U.S. Cl.
CPC ......... *H04N 19/122* (2014.11); *H04N 19/119* (2014.11); *H04N 19/136* (2014.11);
(Continued)

(58) Field of Classification Search
CPC .................................................... H04N 19/122
See application file for complete search history.

(56) References Cited

U.S. PATENT DOCUMENTS

2008/0170615 A1    7/2008  Sekiguchi et al.
2010/0086034 A1    4/2010  Park et al.
(Continued)

FOREIGN PATENT DOCUMENTS

CN    1194754 A    9/1998
EP    2901673 A1   8/2015
(Continued)

OTHER PUBLICATIONS

Joshi et al., "AHG7: Comments on 422 and 444 coding tools and software", 11. JCT-VC Meeting,102. MPEG Meeting,Oct. 10, 2012-Oct. 19, 2012, Shanghai, (Joint Collaborative Team on Video Coding of ISO/IEC JTC1/SC29/WG11 and ITU-T SG.16 ), URL:http://wftp3.itu.int/av-arch/jctvc-site/, No. JCTVC-K0322, Oct. 7, 2012 (Oct. 7, 2012), XP030113204, sections 2 and 3.
(Continued)

*Primary Examiner* — Tracy Y Li
(74) *Attorney, Agent, or Firm* — Canon USA, Inc. I.P. Division

(57) ABSTRACT

Disclosed is method of decoding, from a video bitstream, a transform unit containing at least one chroma residual coefficient array associated with a single chroma channel. The method determines a size of the transform unit related to a hierarchical level of the transform unit in a corresponding coding unit, and identifies a maximum number of inverse transforms according to the determined size. The method decodes from the video bitstream the at least one chroma residual coefficient array using the identified maximum number of transforms, selects an inverse transform for the decoded chroma residual coefficient arrays, the inverse transform being selected from a predetermined set of inverse
(Continued)

transforms, and applies the selected inverse transform to each of the chroma residual coefficient arrays to decode chroma residual samples for the chroma channel of the transform unit. A similar encoding method is also disclosed.

20 Claims, 15 Drawing Sheets

(51) Int. Cl.
    H04N 19/60    (2014.01)
    H04N 19/119    (2014.01)
    H04N 19/186    (2014.01)
    H04N 19/136    (2014.01)
    H04N 19/70    (2014.01)

(52) U.S. Cl.
    CPC ........... *H04N 19/186* (2014.11); *H04N 19/60* (2014.11); *H04N 19/70* (2014.11)

(56) References Cited

U.S. PATENT DOCUMENTS

| | | |
|---|---|---|
| 2012/0177116 A1 | 7/2012 | Panusopone |
| 2012/0183080 A1 | 7/2012 | Zhou |
| 2012/0230421 A1* | 9/2012 | Chen .................... H04N 19/176 375/240.18 |
| 2013/0003824 A1* | 1/2013 | Guo ..................... H04N 19/176 375/240.03 |

FOREIGN PATENT DOCUMENTS

| | | |
|---|---|---|
| RU | 2350041 C2 | 3/2009 |
| RU | 2426269 C2 | 8/2011 |
| RU | 2599935 C2 | 10/2016 |
| WO | 2012096809 A1 | 7/2012 |
| WO | 2013/160693 A2 | 10/2013 |
| WO | 2014/055344 A1 | 4/2014 |

OTHER PUBLICATIONS

An et al., "Non-CE2: Separate RQT structure for Y, U and V components", 99. MPEG Meeting; Feb. 6, 2012-Feb. 10, 2012, San Jose, (Motion Picture Expert Group or ISO/IEC JTC1/SC29NVG11), No. m23190, Jan. 20, 2012 (Jan. 20, 2012), XP030051715, sections 2.2 and 2.3.

Flynn et al., "Proposed Editorial Improvements for High efficiency video coding (HEVC) Text Specification Draft 8 with range extensions", JCT-VC of ITU-T and ISO/IEC. JCTVC-K0383 Ver.1, (JCTVC-0383_based_on_K0030_v6_wd.doc), Oct. 19, 2012, pp. 50-52 and 142-146.

Rosewarne et al., "AHG7: Transforms for extended chroma formats", JCT-VC of ITU-T and ISO/IEC. JCTVC-K0171 Ver. 3, Oct. 11, 2012, pp. 1-3.

Flynn, "BoG report on range extensions", JCT-VC of ITU-T and ISO/IEC. JCTVC-K0365 Ver. 1, Oct. 18, 2012, pp. 1-20.

Bross, B., et al., "High efficiency video coding (HEVC) text specification draft 8", Joint Collaborative Team on Video Coding (JCT-VC) of ITU-T SG16 WP3 and ISO/IEC JTC1/SC29/WG11, 10th Meeting: Stockholm, Sweden, Jul. 11-20, 2012. Document: JCTVC-J1003_d7. [Retrieved on Dec. 3, 2013]. Retrieved from the Internet: <http://phenix.it-sudparis.eu/jct/doc_end_user/documents/10_Stockholm/wg11/JCTVCJ1003-v8.zip> Chapters 5-8.

Wiegand, T. et al., "BoG report: residual quadtree structure", Joint Collaborative Team on Video Coding (JCT-VC) of ITU-T SG16 WP3 and ISO/IEC JTC1/SC29/WG11 3rd Meeting: Guangzhou, CN, Oct. 7-15, 2010. Document: JCTVC-C319. [Retrieved on Dec. 3, 2013]. Retrieved from the Internet: <http://phenix.int-evry.fr/jctdoc_end_user/documents/3_Guangzhou/wg11/JCTVCC319-m18590-v2-JCTVC-C319.zip> Whole of document.

Bross, et al., "High Efficiency Video Coding (HEVC) text specification draft 9", Joint Collaborative Team on Video Coding (JCT-VC) of ITU-T SG16 WP3 and ISO/IEC JTC1/SC29/WG11 11th Meeting, JCTVC-K1003_v13, Oct. 2012.

Kim, et al., "High Efficiency Video Coding (HEVC) Test Model 7 (HM 7) Encoder Description", 9. JCT-VG Meeting; 100. MPEG Meeting; Apr. 27, 2012-May 7, 2012; Geneva; (Joint Collaborative Team on Video Coding of ISO/IEC JTC1/SC29/WG11 and IT SG:16 ); URL: http://wftp3.itu.int/av-arch/jctvc-site/, No. JCTVC-11002, Jul. 9, 2012 (Jul. 9, 2012), XP030112372. The whole document.

Touradj Ebrahimi,"A quick overview of HEVC", Dec. 16, 2011 (Dec. 16, 2011), pp. 1-61, XP055072335, Lausanne, CH Retrieved from the Internet: URL:http://www.videosense.eu/index.php?option=com_phocadownload&view=category&download=15:hevc4videosense&id=11 :teaching-material&Itemid=58 [retrieved on Jul. 22, 2013], p. 47, line 49.

Flynn David, "BoG report: Extended chroma formats", 10. JCT-VC Meeting; 101. MPEG Meeting; Jul. 11, 2012-Jul. 20, 2012; Stockholm; Collaborative Team on Video Coding of ISO/IEC JTC1/SC29/WG11 and IT SG.16 ); URL: http://wftp3.itu.int/av-arch/jctvc-site/, No. JCTVC-J0581, Jul. 19, 2012 (Jul. 19, 2012), XP030112943. The whole document.

Wang, et al., Joint Video Team (JVT) of ISO/IEC MPEG & ITU-T VCEG (ISO/IEC JTC1/SC29/WG11 and ITU-T G16 Q.6), 5th Meeting: Geneva, CH, Oct. 9-17, 2002.

Bross, et al., "JCT-VC AHG report: HEVC Draft and Test Model editing (AHG 2)", Joint Collaborative Team on Video Coding (JCT-VC) of ITU-T SG16 WP3 and ISO/IEC JTC1/SC29/WG11, 9th Meeting: Geneva, CH, Apr. 27-May 7, 2012.

Silcock, et al., AHG12: "Extension of HM7 to Support Additional Chroma Formats", 10. JCT-VC Meeting, 101. MPEG Meeting, Jul. 11, 2012-Jul. 20, 2012, Stockholm, (Joint Collaborative Team on Video Coding of ISO/IEC JTC1/SC29/WG11 and ITU-T SG.16), URL: http://wftp3.itu.int/av-arch/jctvc-site/, No. JCTVC-J0191, Jul. 2, 2012, XP030112553, the whole document.

Rosewarne, et al., "CE1: Test 3—Square transforms for Range Extensions", 103. MPEG Meeting, Jan. 21, 2013-Jan. 25, 2013, Geneva, (Motion Picture Expert Group or ISO/IEC JTC1/SC29/WG11), No. m27482, Jan. 11, 2013, XP030056052, abstract, section 2.

Sole, et al., "CE1: Test 3—Square transform blocks for 4:2:2", 12. JCT-VC Meeting, 103. MPEG Meeting, Jan. 14, 2013-Jan. 23, 2013, Geneva, (Joint Collaborative Team on Video Coding of ISO/IEC JTC1/SC29/WG11 and ITU-T SG.16), URL: http://wftp3.itu.int/av-arch/jctvc-site/, No. JCTVC-L0333, Jan. 8, 2013, XP030113821, abstract, section 1.

* cited by examiner

METHOD, APPARATUS AND SYSTEM FOR ENCODING AND DECODING THE TRANSFORM UNITS OF A CODING UNIT

REFERENCE TO RELATED APPLICATION(S)

This application claims the benefit under 35 U.S.C. §119 of the filing date of Australian Patent Application No. 2012232992, filed Sep. 28, 2012, hereby incorporated by reference in its entirety as if fully set forth herein.

TECHNICAL FIELD

The present invention relates generally to digital video signal processing and, in particular, to a method, apparatus and system for encoding and decoding residual coefficients of a transform unit (TU), wherein the transform unit (TU) includes one or more transform units (TUs) and may be configured for multiple chroma formats, including a 4:2:2 chroma format.

BACKGROUND

Many applications for video coding currently exist, including applications for transmission and storage of video data. Many video coding standards have also been developed and others are currently in development. Recent developments in video coding standardisation have led to the formation of a group called the "Joint Collaborative Team on Video Coding" (JCT-VC). The Joint Collaborative Team on Video Coding (JCT-VC) includes members of Study Group 16, Question 6 (SG16/Q6) of the Telecommunication Standardisation Sector (ITU-T) of the International Telecommunication Union (ITU), known as the Video Coding Experts Group (VCEG), and members of the International Organisations for Standardisation/International Electrotechnical Commission Joint Technical Committee 1/Subcommittee 29/Working Group 11 (ISO/IEC JTC1/SC29/WG11), also known as the Moving Picture Experts Group (MPEG).

The Joint Collaborative Team on Video Coding (JCT-VC) has the goal of producing a new video coding standard to significantly outperform a presently existing video coding standard, known as "H.264/MPEG-4 AVC". The H.264/MPEG-4 AVC standard is itself a large improvement on previous video coding standards, such as MPEG-4 and ITU-T H.263. The new video coding standard under development has been named "high efficiency video coding (HEVC)". The Joint Collaborative Team on Video Coding JCT-VC is also considering implementation challenges arising from technology proposed for high efficiency video coding (HEVC) that create difficulties when scaling implementations of the standard to operate at high resolutions in real-time or high frame rates. One implementation challenge is the complexity and size of logic used to support multiple 'transform' sizes for transforming video data between the frequency domain and the spatial domain.

SUMMARY

It is an object of the present invention to substantially overcome, or at least ameliorate, one or more disadvantages of existing arrangements.

According to one aspect of the present disclosure there is provided a method of decoding a transform unit containing chroma residual coefficients from a video bitstream, the transform unit containing at least one chroma residual coefficient array associated with a single chroma channel, the method comprising:

determining a size of the transform unit, the size being related to a hierarchical level of the transform unit in a corresponding coding unit;

identifying a maximum number of inverse transforms, used for transforming the at least one chroma residual coefficient array, according to the determined size;

decoding from the video bitstream the at least one chroma residual coefficient array using the identified maximum number of transforms for the chroma channel of the transform unit;

selecting an inverse transform for the decoded chroma residual coefficient arrays, the inverse transform being selected from a predetermined set of inverse transforms; and applying the selected inverse transform to each of the chroma residual coefficient arrays to decode chroma residual samples for the chroma channel of the transform unit.

According to another aspect of the present disclosure there is provided a method of encoding into a video bitstream a transform unit containing chroma residual samples associated with a single chroma channel, the transform unit containing at least one chroma residual sample array, the method comprising:

determining a size of the transform unit, the size being related to a hierarchical level of the transform unit in a corresponding coding unit;

identifying a maximum number of predetermined forward transforms, used for transforming the at least one chroma residual sample array, according to the determined size;

selecting a forward transform for the chroma residual sample arrays, the forward transform being selected from a predetermined set of forward transforms;

applying the selected forward transform to each of the chroma residual sample arrays to transform at least one of the chroma residual sample arrays into a corresponding chroma residual coefficient array for the chroma channel of the transform unit; and encoding the chroma residual coefficient arrays for the chroma channel of the transform unit;

Preferably the maximum number of transforms is one or two. Desirably the number is two and is applied in a 4:2:2 chroma format to a 32×16 sized chroma region of the transform unit.

Advantageously, the number of transforms is selected from the set of one, two and four. In a specific implementation the number is four and is applied in a 4:4:4 chroma format to a 32×32 sized chroma region of the transform unit.

Preferably a single scan is applied covering the identified number of transforms. Desirably coefficients of the identified number of transforms are interleaved.

In one implementation, a transform unit having the size of 4×8 is scanned using a 4×4 sub-block scan pattern.

In another, the number of transforms applied is determined using at least a code block flag. Desirably the number of transforms applied is determined using the identified maximum number of transforms and a coded block flag value for each transform.

In accordance with another aspect of the present disclosure, there is provided a method of decoding a transform unit containing chroma residual samples from a video bitstream, the transform unit containing at least one chroma residual coefficient array associated with a single chroma channel in a 4:2:2 chroma format, the method comprising:

determining a hierarchical level for the transform unit within a coding unit, from split transform flags present in the video bitstream, wherein a coding unit size ranges from a smallest coding unit to a largest coding unit;

determining a transform size of the transform unit for the single chroma channel, the transform size being related to the determined hierarchical level of the transform unit and the coding unit size;

determining a plurality of coded block flag values from the video bitstream for a single chroma channel of the transform unit, wherein the transform unit has a plurality of chroma residual coefficient arrays for a single colour channel and each coded block flag value of the plurality of coded block flag values corresponds to one chroma residual coefficient array of the chroma residual coefficient arrays;

decoding from the video bitstream each of a plurality of chroma residual coefficient arrays according to a corresponding coded block flag value of the plurality of coding block flag values;

selecting a square inverse transform for the decoded chroma residual coefficient arrays, the square inverse transform being selected from a predetermined set of square inverse transforms according to the determined transform size; and applying the selected square inverse transform to each of the decoded chroma residual coefficient arrays to produce the chroma residual samples for the chroma channel of the transform unit.

According to another aspect of the disclosure, provided is a method of encoding a transform unit containing chroma residual samples to a video bitstream, the transform unit containing at least one chroma residual coefficient array associated with a single chroma channel in a 4:2:2 chroma format, the method comprising:

encoding split transform flags to the video bitstream based on a received hierarchical level for the transform unit within a coding unit, wherein a coding unit size ranges from a smallest coding unit to a largest coding unit;

receiving a transform size of the transform unit for the single chroma channel, the transform size being related to the hierarchical level of the transform unit and the coding unit size;

encoding a plurality of coded block flag values to the video bitstream for a single chroma channel of the transform unit, wherein the transform unit has a plurality of chroma residual coefficient arrays for a single colour channel and each coded block flag value of the plurality of coded block flag values corresponds to one chroma residual coefficient array of the chroma residual coefficient arrays;

selecting a square forward transform for the chroma residual coefficient arrays, the square forward transform being selected from a predetermined set of square forward transforms according to the received transform size;

applying the selected square forward transform to each of the decoded chroma residual coefficient arrays to produce the chroma residual samples for the chroma channel of the transform unit; and encoding to the video bitstream each of the plurality of chroma residual coefficient arrays according to a corresponding coded block flag value of the plurality of coding block flag values.

Other aspects are also disclosed.

BRIEF DESCRIPTION OF THE DRAWINGS

At least one embodiment of the present invention will now be described with reference to the following drawings, in which:

FIGS. 5A and 5B schematically illustrate chroma formats for representing frame data;

DETAILED DESCRIPTION INCLUDING BEST MODE

Figure 1:
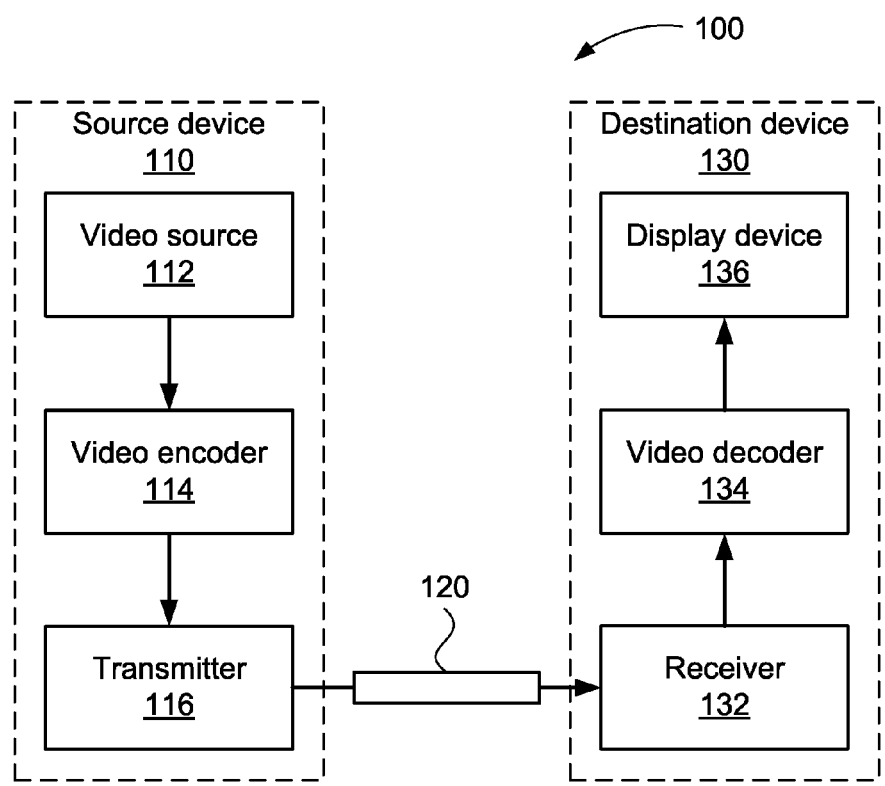
FIG. 1 is a schematic block diagram showing a video encoding and decoding system.

Where reference is made in any one or more of the accompanying drawings to steps and/or features, which have the same reference numerals, those steps and/or features have for the purposes of this description the same function (s) or operation(s), unless the contrary intention appears.

FIG. 1 is a schematic block diagram showing function modules of a video encoding and decoding system 100 that may utilise techniques for coding syntax elements representative of inferred subdivision of transform units into multiple transforms for a chroma channel. The system 100 includes a source device 110 and a destination device 130. A communication channel 120 is used to communicate encoded video information from the source device 110 to the destination device 130. In some cases, the source device 110 and destination device 130 may comprise respective mobile telephone hand-sets, in which case the communication channel 120 is a wireless channel. In other cases, the source device 110 and destination device 130 may comprise video conferencing equipment, in which case the communication channel 120 is typically a wired channel, such as an internet connection. Moreover, the source device 110 and the destination device 130 may comprise any of a wide range of devices, including devices supporting over the air television broadcasts, cable television applications, internet video applications and including applications where the encoded video is captured on some storage medium or a file server.

As illustrated, the source device 110 includes a video source 112, a video encoder 114 and a transmitter 116. The video source 112 typically comprises a source of captured video frame data, such as an imaging sensor, a previously captured video sequence stored on a non-transitory recording medium, or a video feed from a remote imaging sensor. Examples of source devices 110 that may include an imaging sensor as the video source 112 include smart-phones, video camcorders and network video cameras. The video encoder 114 converts the captured frame data from the video source 112 into encoded video data and will be described further with reference to FIG. 3. The encoded video data is typically transmitted by the transmitter 116 over the communication channel 120 as encoded video information. It is also possible for the encoded video data to be stored in some storage device, such as a "Flash" memory or a hard disk drive, until later being transmitted over the communication channel 120.

The destination device 130 includes a receiver 132, a video decoder 134 and a display device 136. The receiver 132 receives encoded video information from the communication channel 120 and passes received video data to the video decoder 134. The video decoder 134 then outputs decoded frame data to the display device 136. Examples of the display device 136 include a cathode ray tube, a liquid crystal display, such as in smart-phones, tablet computers, computer monitors or in stand-alone television sets. It is also possible for the functionality of each of the source device 110 and the destination device 130 to be embodied in a single device.

Figure 2A:
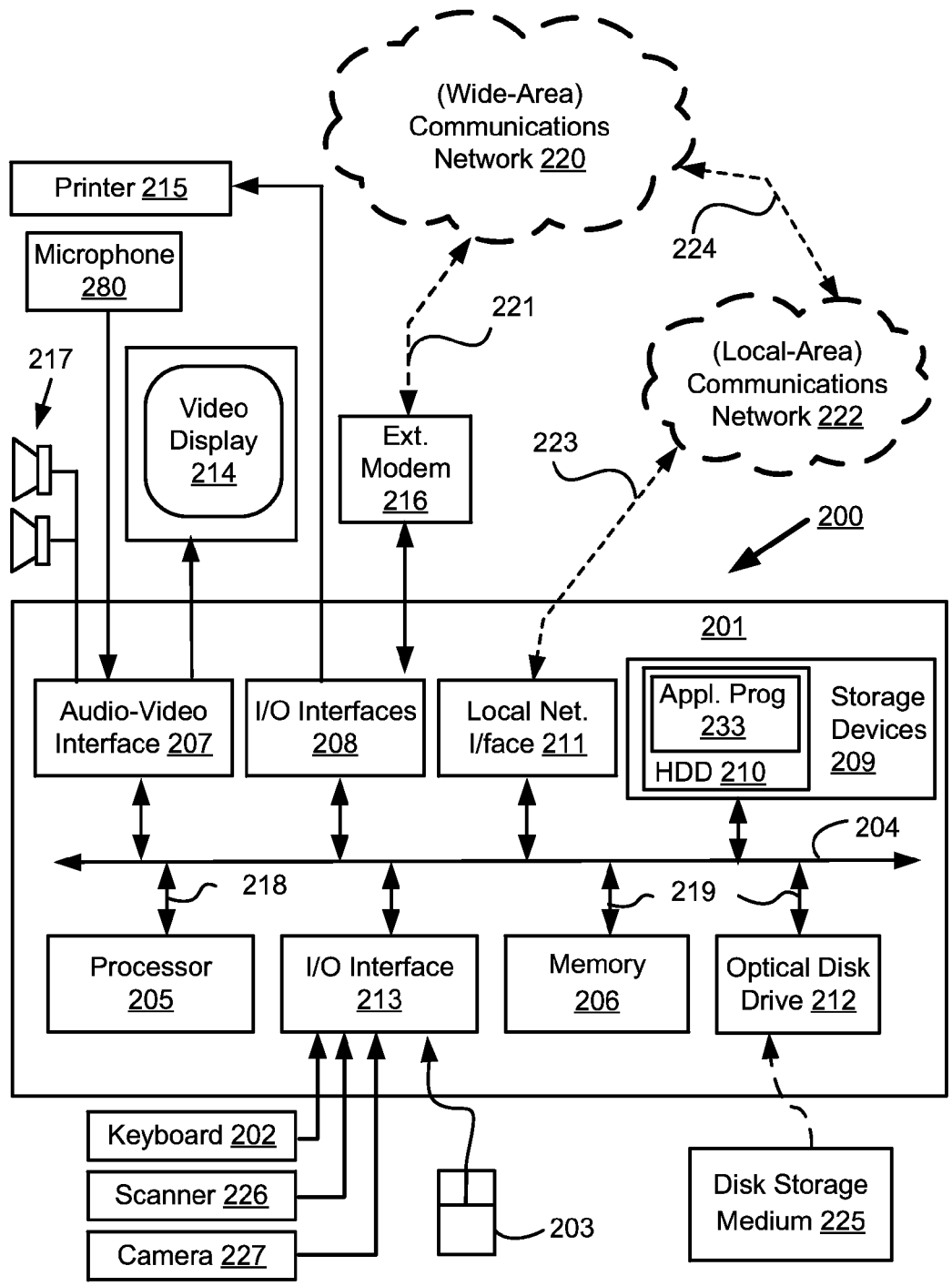
FIGS. 2A and 2B form a schematic block diagram of a general purpose computer system upon which one or both of the video encoding and decoding system of FIG. 1 may be practiced.

Notwithstanding the exemplary devices mentioned above, each of the source device 110 and destination device 130 may be configured within a general purpose computing system, typically through a combination of hardware and software components. FIG. 2A illustrates such a computer system 200, which includes: a computer module 201; input devices such as a keyboard 202, a mouse pointer device 203, a scanner 226, a camera 227, which may be configured as the video source 112, and a microphone 280; and output devices including a printer 215, a display device 214, which may be configured as the display device 136, and loudspeakers 217. An external Modulator-Demodulator (Modem) transceiver device 216 may be used by the computer module 201 for communicating to and from a communications network 220 via a connection 221. The communications network 220, which may represent the communication channel 120, may be a wide-area network (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable) connection, the modem 216 may be a broadband modem. A wireless modem may also be used for wireless connection to the communications network 220. The transceiver device 216 may provide the functionality of the transmitter 116 and the receiver 132 and the communication channel 120 may be embodied in the connection 221.

The computer module 201 typically includes at least one processor unit 205, and a memory unit 206. For example, the memory unit 206 may have semiconductor random access memory (RAM) and semiconductor read only memory (ROM). The computer module 201 also includes an number of input/output (I/O) interfaces including: an audio-video interface 207 that couples to the video display 214, loudspeakers 217 and microphone 280; an I/O interface 213 that couples to the keyboard 202, mouse 203, scanner 226, camera 227 and optionally a joystick or other human interface device (not illustrated); and an interface 208 for the external modem 216 and printer 215. In some implementations, the modem 216 may be incorporated within the computer module 201, for example within the interface 208. The computer module 201 also has a local network interface 211, which permits coupling of the computer system 200 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet circuit card, a Bluetooth™ wireless arrangement or an IEEE 802.11 wireless arrangement; however, numerous other types of interfaces may be practised for the interface 211. The local network interface 211 may also provide the functionality of the transmitter 116 and the receiver 132 and communication channel 120 may also be embodied in the local communications network 222.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g. CD-ROM, DVD, Blu-ray Disc™), USB-RAM, portable, external hard drives, and floppy disks, for example, may be used as appropriate sources of data to the computer system 200. Typically, any of the HDD 210, optical drive 212, networks 220 and 222 may also be configured to operate as the video source 112, or as a destination for decoded video data to be stored for reproduction via the display 214.

The components 205 to 213 of the computer module 201 typically communicate via an interconnected bus 204 and in a manner that results in a conventional mode of operation of the computer system 200 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Sun SPARCstations, Apple Mac™ or alike computer systems.

Where appropriate or desired, the video encoder 114 and the video decoder 134, as well as methods described below, may be implemented using the computer system 200 wherein the video encoder 114, the video decoder 134 and the processes of FIGS. 10 to 13, to be described, may be implemented as one or more software application programs 233 executable within the computer system 200. In particular, the video encoder 114, the video decoder 134 and the steps of the described methods are effected by instructions 231 (see FIG. 2B) in the software 233 that are carried out within the computer system 200. The software instructions 231 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 200 from the computer readable medium, and then executed by the computer system 200. A computer readable medium having such software or computer program recorded on the computer readable medium is a computer program product. The use of the computer program product in the computer system 200 preferably effects an advantageous apparatus for implementing the video encoder 114, the video decoder 134 and the described methods.

The software 233 is typically stored in the HDD 210 or the memory 206. The software is loaded into the computer system 200 from a computer readable medium, and executed by the computer system 200. Thus, for example, the software 233 may be stored on an optically readable disk storage medium (e.g., CD-ROM) 225 that is read by the optical disk drive 212.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 200 from other computer readable media. Computer readable storage media refers to any non-transitory tangible storage medium that provides recorded instructions and/or data to the computer system 200 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of the software, application programs, instructions and/or video data or encoded video data to the computer module 401 include radio or infra-red transmission channels as well as a network connection to another computer or networked device, and the Internet or Intranets including e-mail transmissions and information recorded on Websites and the like.

The second part of the application programs 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

Figure 2B:
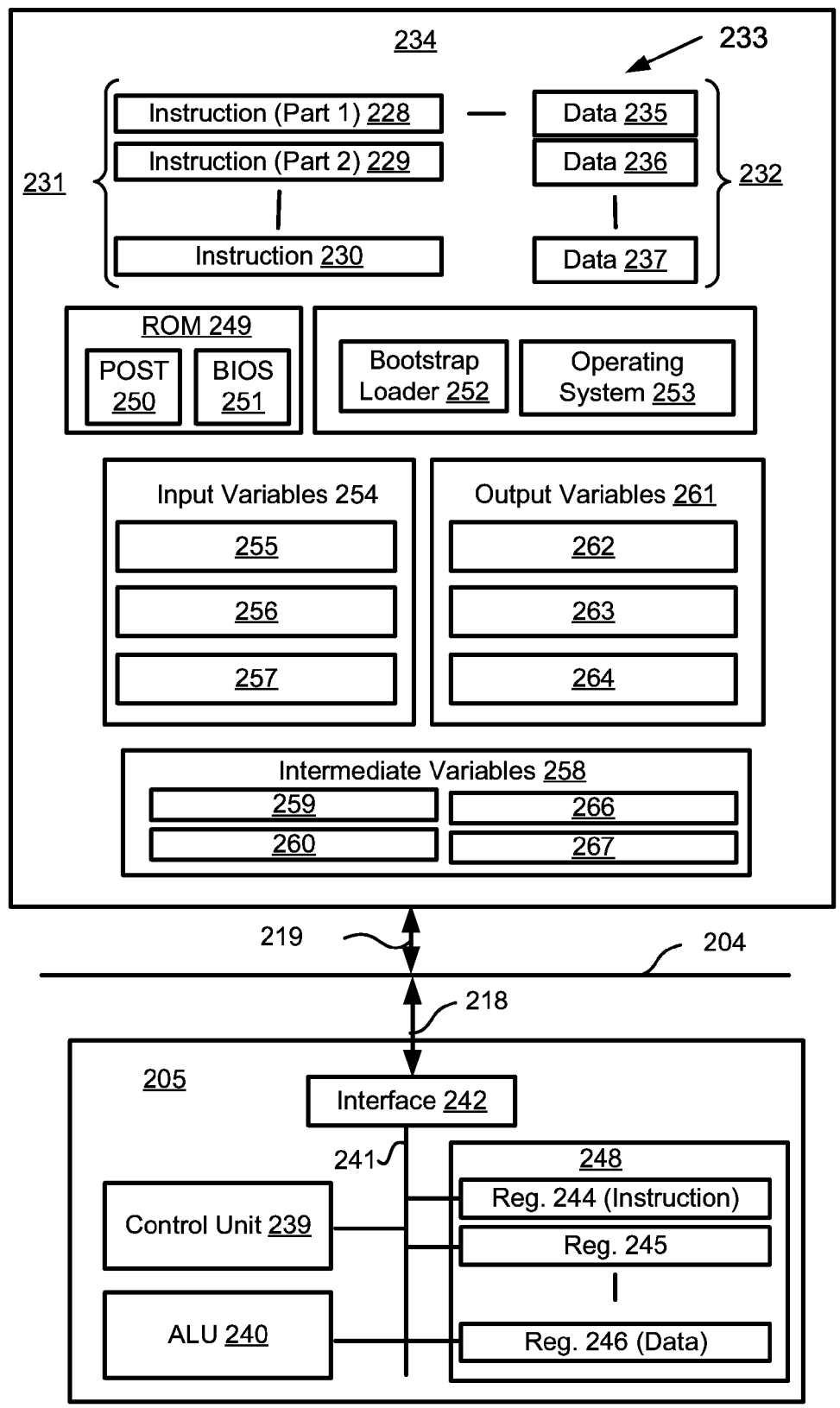

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfill various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the computer system 200 of FIG. 2A must be used properly so that each process can run effectively. Accordingly, the aggregated memory 234 is not intended to illustrate how particular segments of memory are allocated (unless otherwise stated), but rather to provide a general view of the memory accessible by the computer system 200 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The video encoder 114, the video decoder 134 and the described methods may use input variables 254, which are stored in the memory 234 in corresponding memory locations 255, 256, 257. The video encoder 114, the video decoder 134 and the described methods produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

(a) a fetch operation, which fetches or reads an instruction 231 from a memory location 228, 229, 230;

(b) a decode operation in which the control unit 239 determines which instruction has been fetched; and (c) an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Each step or sub-process in the processes of FIGS. 10 to 13 to be described is associated with one or more segments of the program 233 and is typically performed by the register section 244, 245, 247, the ALU 240, and the control unit 239 in the processor 205 working together to perform the fetch, decode, and execute cycles for every instruction in the instruction set for the noted segments of the program 233.

Figure 3:
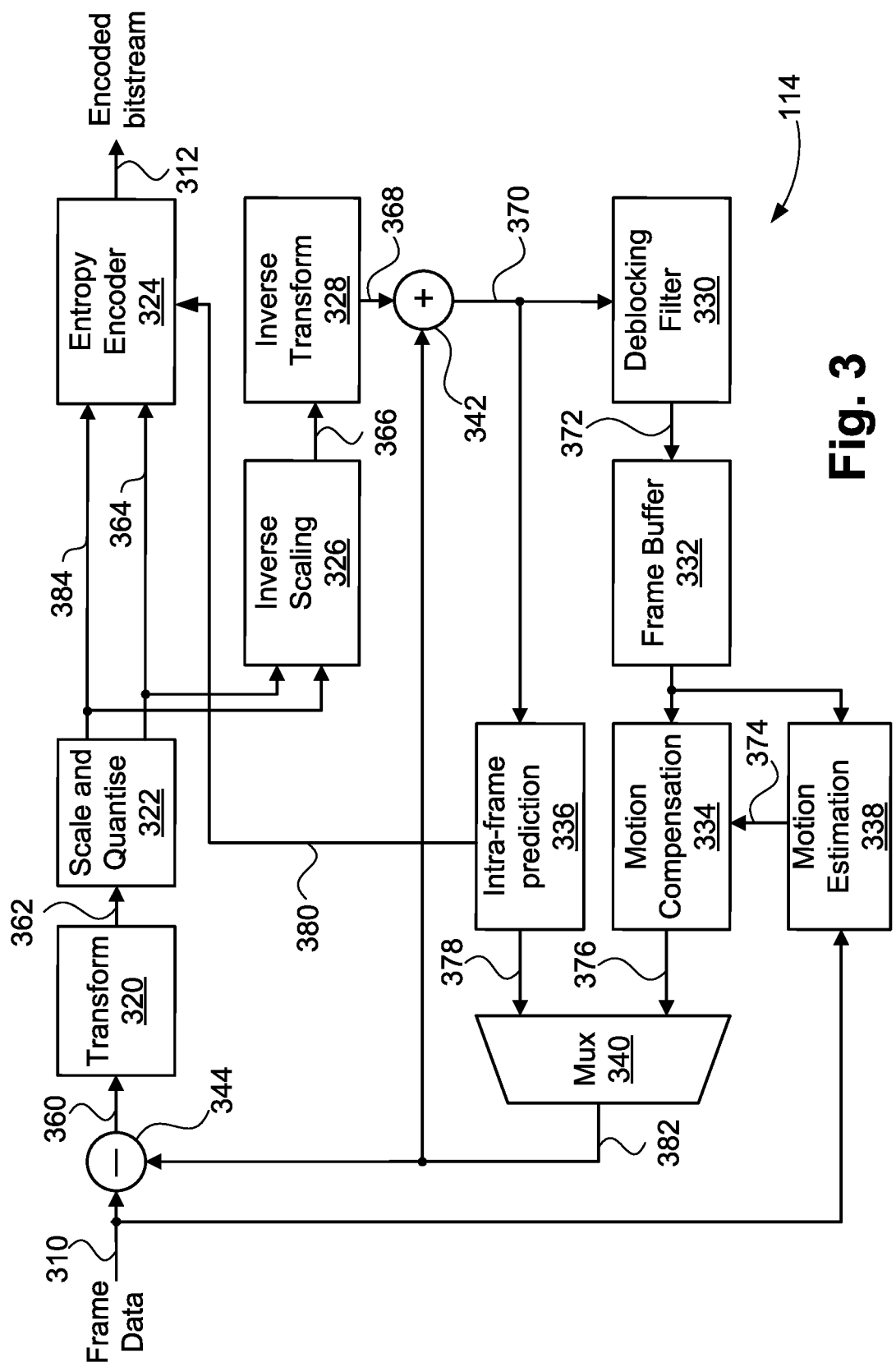
FIG. 3 is a schematic block diagram showing functional modules of a video encoder.
Figure 4:
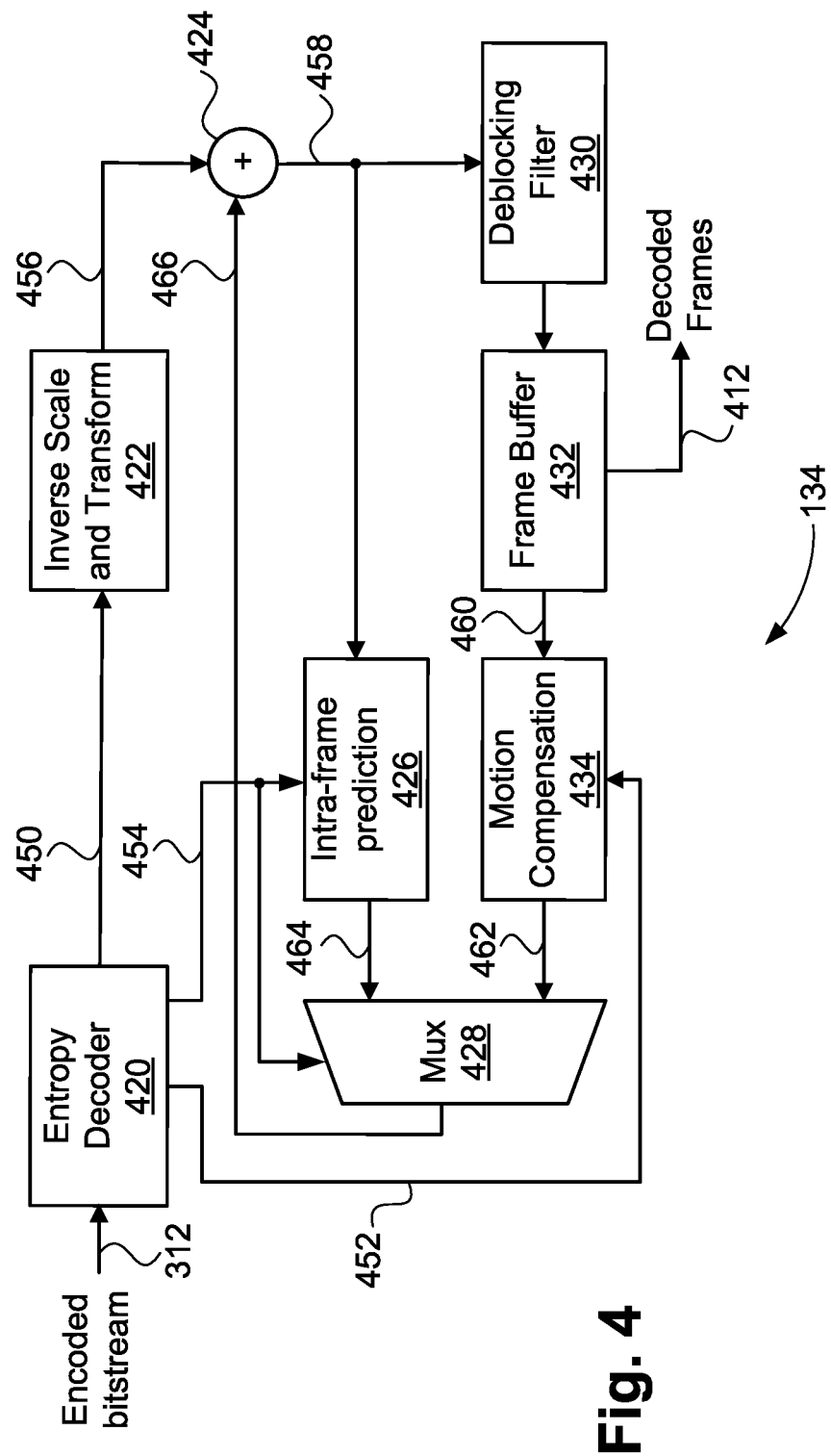
FIG. 4 is a schematic block diagram showing functional modules of a video decoder.

FIG. 3 is a schematic block diagram showing functional modules of the video encoder 114. FIG. 4 is a schematic block diagram showing functional modules of the video decoder 134. The video encoder 114 and video decoder 134 may be implemented using a general-purpose computer system 200, as shown in FIGS. 2A and 2B, where the various functional modules may be implemented by dedicated hardware within the computer system 200, by software executable within the computer system 200 such as one or more software code modules of the software application program 233 resident on the hard disk drive 205 and being controlled in its execution by the processor 205, or alternatively by a combination of dedicated hardware and software executable within the computer system 200. The video encoder 114, the video decoder 134 and the described methods may alternatively be implemented in dedicated hardware, such as one or more integrated circuits performing the functions or sub functions of the described methods. Such dedicated hardware may include graphic processors, digital signal processors, application specific integrated circuits (ASICs), field programmable gate arrays (FPGAs) or one or more microprocessors and associated memories. In particular the video encoder 114 comprises modules 320-344 and the video decoder 134 comprises modules 420-434 which may each be implemented as one or more software code modules of the software application program 233.

Although the video encoder 114 of FIG. 3 is an example of a high efficiency video coding (HEVC) video encoding pipeline, processing stages performed by the modules 320-344 are common to other video codecs such as VC-1 or H.264/MPEG-4 AVC. The video encoder 114 receives captured frame data, such as captured frame data, as a series of frames, each frame including one or more colour channels. Each frame comprises one sample grid per colour channel. Colour information is represented using a 'colour space', such as recommendation ITU-R BT.709 ('YUV'), although other colour spaces are also possible. When the YUV colour space is used, the colour channels include a luma channel ('Y') and two chroma channels ('U' and 'V'). Moreover, differing amounts of information may be included in the sample grid of each colour channel, depending on the sampling of the image or through application of filtering to resample the captured frame data. Several sampling approaches, known as 'chroma formats' exist, some of which will be described with reference to FIGS. 5A and 5B.

The video encoder 114 divides each frame of the captured frame data, such as frame data 310, into regions generally referred to as 'coding tree blocks' (CTBs). Each coding tree block (CTB) includes a hierarchical quad-tree subdivision of a portion of the frame into a collection of 'coding units' (CUs). The coding tree block (CTB) generally occupies an area of 64×64 luma samples, although other sizes are possible, such as 16×16 or 32×32. In some cases even larger sizes, such as 128×128, may be used. The coding tree block (CTB) may be sub-divided via a split into four equal sized regions to create a new hierarchy level. Splitting may be applied recursively, resulting in a quad-tree hierarchy. As the coding tree block (CTB) side dimensions are always powers of two and the quad-tree splitting always results in a halving of the width and height, the region side dimensions are also always powers of two. When no further split of a region performed, a 'coding unit' (CU) is said to exist within the region. When no split is performed at the top level of the coding tree block, the region occupying the entire coding tree block contains one coding unit (CU) that is generally referred to as a 'largest coding unit' (LCU). A minimum size also exists for each coding unit, such as the area occupied by 8×8 luma samples, although other minimum sizes are also possible. Coding units of this size are generally referred to as 'smallest coding units' (SCUs). As a result of this quad-tree hierarchy, the entirety of the coding tree block (CTB) is occupied by one or more coding units (CUs).

The video encoder 114 produces one or more arrays of samples, generally referred to as 'prediction units' (PUs) for each coding unit (CU). Various arrangements of prediction units (PUs) in each coding unit (CU) are possible, with a requirement that the prediction units (PUs) do not overlap and that the entirety of the coding unit (CU) is occupied by the one or more prediction units (PUs). This scheme ensures that the prediction units (PUs) cover the entire frame area.

The video encoder 114 operates by outputting, from a multiplexer module 340, a prediction unit (PU) 382. A difference module 344 outputs the difference between the prediction unit (PU) 382 and a corresponding 2D array of data samples from a coding unit (CU) of the coding tree block (CTB) of the frame data 310, the difference being known as a 'residual sample array' 360. The residual sample array 360 from the difference module 344 is received by a transform module 320, which converts (or 'encodes') the residual sample array 360 from a spatial representation to a frequency domain representation by applying a 'forward transform'. The transform module 320 creates transform coefficients 362 for each transform in a transform unit (TU) in a hierarchical sub-division of the coding unit (CU) into one or more transform units (TUs) generally referred to as a 'transform tree'. For the high efficiency video coding (HEVC) standard under development, the conversion to the frequency domain representation is implemented using a modified discrete cosine transform (DCT), in which a traditional DCT is modified to be implemented using shifts and additions. Various sizes for the residual sample array 360 and the transform coefficients 362 are possible, in accordance with the supported transform sizes. In the high efficiency video coding (HEVC) standard under development, transforms are performed on 2D arrays of samples having specific sizes, such as 32×32, 16×16, 8×8 and 4×4. A predetermined set of transform sizes available to a video encoder 114 may thus be said to exist. Moreover, as foreshadowed above, the set of transform sizes may differ between the luma channel and the chroma channels. Two-dimensional transforms are generally configured to be 'separable', enabling implementation as a first set of 1D transforms operating on the 2D array of samples in one direction (e.g. on rows), followed by a second set of 1D transform operating on the 2D array of samples output from the first set of 1D transforms in the other direction (e.g. on columns) Transforms having the same width and height are generally referred to as 'square transforms'. Additional transforms, having differing widths and heights are also possible and are generally referred to as 'non-square transforms'. Optimised implementations of the transforms may combine the row and column one-dimensional transforms into specific hardware or software modules, such as a 4×4 transform module or an 8×8 transform module. Transforms having larger dimensions require larger amounts of circuitry to implement, even though they may be infrequently used. Accordingly, a maximum transform size of 32×32 exists in the high efficiency video coding (HEVC) standard under development. The integrated nature of transform implementation also introduces a preference to reduce the number of non-square transform sizes supported, as these will typically require entirely new hardware to be implemented, instead of reusing existing one-dimensional transform logic present from corresponding square transforms. Transforms are applied to both the luma and chroma channels. Differences between the handling of luma and chroma channels with regard to transform units (TUs) exist and will be discussed below with reference to FIGS. 5A and 5B. Each transform tree occupies one coding unit (CU) and is defined as a quad-tree decomposition of the coding unit (CU) into a hierarchy containing one transform unit (TU) at each leaf node of the transform tree (quad-tree) hierarchy, with each transform unit (TU) able to make use of transforms of the supported transform sizes. Similarly to the coding tree block (CTB), it is necessary for the entirety of the coding unit (CU) to be occupied by one or more transform units (TUs). At each level of the transform tree quad-tree hierarchy a 'coded block flag value' signals the possible presence of a transform in each colour channel, either in the present hierarchy level when no further splits are present, or to signal that lower hierarchy levels may contain at least one transform among the resulting transform units (TUs). When the coded block flag value is zero, no transform is performed for the corresponding colour channel of any transform units (TU) of the transform tree, either at the present hierarchical level or at lower hierarchical levels. When the coded block flag value is one, the region contains a transform which must have at least one nonzero residual coefficient. In this manner, for each colour channel, zero or more transforms may cover a portion of the area of the coding unit (CU) varying from none up to the entirety of the coding unit (CU). Separate coded block flag values exist for each colour channel. Each coded block flag value is not required to be encoded, as cases exist where there is only one possible coded block flag value.

The transform coefficients 362 are then input to a scale and quantize module 322 and are scaled and quantized according to a determined quantization parameter 384 to produce residual coefficient array 364. The scale and quantization process results in a loss of precision, dependent on the value of the determined quantization parameter 384. A higher value of the determined quantization parameter 384 results in greater information being lost from the transform coefficients. This increases the compression achieved by the video encoder 114 at the expense of reducing the visual quality of the output from the video decoder 134. The determined quantization parameter 384 may be adapted during encoding of each frame of the frame data 310, or it may be fixed for a portion of the frame data 310, such as an entire frame. Other adaptations of the determined quantisation parameter 384 are also possible, such as quantising different residual coefficients with separate values. The residual coefficient array 364 and determined quantization parameter 384 are taken as input to an inverse scaling module 326 which reverses the scaling performed by the scale and quantize module 322 to produce resealed transform coefficient arrays 366, which are resealed versions of the residual coefficient array 364.

The residual coefficient array 364 and the determined quantisation parameter 384 are also taken as input to an entropy encoder module 324 which encodes the residual coefficients in an encoded bitstream 312 (or 'video bitstream'). The residual coefficient array 364 of each transform in each transform unit (TU) are encoded in groups generally known as 'sub-blocks'. Sub-blocks should preferably have the same dimensions regardless of the size of the transform, as this permits reuse of logic relating to sub-block processing. The residual coefficients within one sub-block are generally referred to as a 'coefficient group' and for each coefficient group, a coefficient group flag is generally encoded to indicate if at least one residual coefficient within the coefficient group is non-zero. In some cases the coefficient group flag may be inferred and thus is not encoded. A flag is encoded for each residual coefficient belonging to a coefficient group having a coefficient group flag value of one to indicate if the residual coefficient is non-zero ('significant') or zero ('non-significant'). Due to the loss of precision resulting from the scale and quantise module 322, the resealed transform coefficient arrays 366 are not identical to the original transform coefficients 362. The resealed transform coefficient arrays 366 from the inverse scaling module 326 are then output to an inverse transform module 328. The inverse transform module 328 performs an inverse transform from the frequency domain to the spatial domain to produce a spatial-domain representation 368 of the resealed transform coefficient arrays 366 identical to a spatial domain representation that is produced at the video decoder 134.

A motion estimation module 338 produces motion vectors 374 by comparing the frame data 310 with previous frame data from one or more sets of frames stored in a frame buffer module 332, generally configured within the memory 206. The sets of frames are known as 'reference picture lists'. The motion vectors 374 are then input to a motion compensation module 334 which produces an inter-predicted prediction unit (PU) 376 by filtering samples stored in the frame buffer module 332, taking into account a spatial offset derived from the motion vectors 374. Not illustrated in FIG. 3, the motion vectors 374 are also passed as syntax elements to the entropy encoder module 324 for encoding in the encoded bitstream 312. An intra-frame prediction module 336 produces an intra-predicted prediction unit (PU) 378 using samples 370 obtained from a summation module 342, which sums the prediction unit (PU) 382 from the multiplexer module 340 and the spatial domain representation 368 from the inverse transform module 328. The intra-frame prediction module 336 also produces an intra-prediction mode 380 which is sent to the entropy encoder 324 for encoding into the encoded bitstream 312.

Prediction units (PUs) may be generated using either an intra-prediction or an inter-prediction method. Intra-prediction methods make use of samples adjacent to the prediction unit (PU) that have previously been decoded (typically above and to the left of the prediction unit) in order to generate reference samples within the prediction unit (PU). Various directions of intra-prediction are possible, referred to as the 'intra-prediction mode'. Inter-prediction methods make use of a motion vector to refer to a block from a selected reference frame. As the block may have any alignment down to a sub-sample precision, e.g. one eighth of a sample, filtering is necessary to create a block of reference samples for the prediction unit (PU). The decision on which method to use is made according to a rate-distortion trade-off between desired bit-rate of the resulting encoded bitstream 312 and the amount of image quality distortion introduced by either the intra-prediction or inter-prediction method. If intra-prediction is used, one intra-prediction mode is selected from the set of intra-prediction possible modes, also according to a rate-distortion trade-off. The multiplexer module 340 selects either the intra-predicted reference samples 378 from the intra-frame prediction module 336, or the inter-predicted prediction unit (PU) 376 from the motion compensation block 334, depending on the decision made by the rate distortion algorithm. The summation module 342 produces a sum 370 that is input to a deblocking filter module 330. The deblocking filter module 330 performs filtering along block boundaries, producing deblocked samples 372 that are written to the frame buffer module 332 configured within the memory 206. The frame buffer module 332 is a buffer with sufficient capacity to hold data from one or more past frames for future reference as part of a reference picture list.

For the high efficiency video coding (HEVC) standard under development, the encoded bitstream 312 produced by the entropy encoder 324 is delineated into network abstraction layer (NAL) units. Generally, each slice of a frame is contained in one NAL unit. The entropy encoder 324 encodes the residual coefficient array 364, the intra-prediction mode 380, the motion vectors and other parameters, collectively referred to as 'syntax elements', into the encoded bitstream 312 by performing a context adaptive binary arithmetic coding (CABAC) algorithm. Syntax elements are grouped together into 'syntax structures', these groupings may contain recursion to describe hierarchical structures. In addition to ordinal values, such as an intra-prediction mode or integer values, such as a motion vector, syntax elements also include flags, such as to indicate a quad-tree split. The motion estimation module 338 and motion compensation module 334 operate on motion vectors 374, having a precision of ⅛ of a luma sample, enabling precise modelling of motion between frames in the frame data 310.

Although the video decoder 134 of FIG. 4 is described with reference to a high efficiency video coding (HEVC) video decoding pipeline, processing stages performed by the modules 420-434 are common to other video codecs that employ entropy coding, such as H.264/MPEG-4 AVC, MPEG-2 and VC-1. The encoded video information may also be read from memory 206, the hard disk drive 210, a CD-ROM, a Blu-Ray™ disk or other computer readable storage medium. Alternatively the encoded video information may be received from an external source such as a server connected to the communications network 220 or a radio-frequency receiver.

As seen in FIG. 4, received video data, such as the encoded bitstream 312, is input to the video decoder 134. The encoded bitstream 312 may be read from memory 206, the hard disk drive 210, a CD-ROM, a Blu-Ray™ disk or other computer readable storage medium. Alternatively the encoded bitstream 312 may be received from an external source such as a server connected to the communications network 220 or a radio-frequency receiver. The encoded bitstream 312 contains encoded syntax elements representing the captured frame data to be decoded.

The encoded bitstream 312 is input to an entropy decoder module 420 which extracts the syntax elements from the encoded bitstream 312 and passes the values of the syntax elements to other blocks in the video decoder 134. The entropy decoder module 420 applies the context adaptive binary arithmetic coding (CABAC) algorithm to decode syntax elements from the encoded bitstream 312. The decoded syntax elements are used to reconstruct parameters within the video decoder 134. Parameters include zero or more residual coefficient array 450, motion vectors 452 and a prediction mode 454. The residual coefficient array 450 are passed to an inverse scale and transform module 422, the motion vectors 452 are passed to a motion compensation module 434 and the prediction mode 454 is passed to an intra-frame prediction module 426 and a multiplexer 428. The inverse scale and transform module 422 performs inverse scaling on the residual coefficient data to create reconstructed transform coefficients. The inverse scale and transform module 422 then applies an 'inverse transform' to convert (or 'decode') the reconstructed transform coefficients from a frequency domain representation to a spatial domain representation, producing a residual sample array 456. The inverse transform within the inverse scale and transform module 422 performs the same operation as the inverse transform 328. The inverse scale and transform module 422 must therefore be configured to provide a predetermined set of transform sizes required to decode an encoded bitstream 312 that is compliant with the high efficiency video coding (HEVC) standard under development.

The motion compensation module 434 uses the motion vectors 452 from the entropy decoder module 420, combined with reference frame data 460 from the a frame buffer block 432, configured within the memory 206, to produce an inter-predicted prediction unit (PU) 462 for a prediction unit (PU), being a prediction of output decoded frame data. When the prediction mode 454 indicates that the current prediction unit was coded using intra-prediction, the intra-frame prediction module 426 produces an intra-predicted prediction unit (PU) 464 for the prediction unit (PU) using samples spatially neighbouring the prediction unit (PU) and a prediction direction also supplied by the prediction mode 454. The spatially neighbouring samples are obtained from a sum 458, output from a summation module 424. The multiplexer module 428 selects the intra-predicted prediction unit (PU) 464 or the inter-predicted prediction unit (PU) 462 for a prediction unit (PU) 466, depending on the current prediction mode 454. The prediction unit (PU) 466, output from the multiplexer module 428, is added to the residual sample array 456 from the inverse scale and transform module 422 by the summation module 424 to produce the sum 458 which is then input to each of a deblocking filter module 430 and the intra-frame prediction module 426. The deblocking filter module 430 performs filtering along data block boundaries, such as transform unit (TU) boundaries, to smooth visible artefacts. The output of the deblocking filter module 430 is written to the frame buffer module 432 configured within the memory 206. The frame buffer module 432 provides sufficient storage to hold one or more decoded frames for future reference. Decoded frames 412 are also output from the frame buffer module 432 to a display device, such as the display device 136.

Figures 5A, 5B:
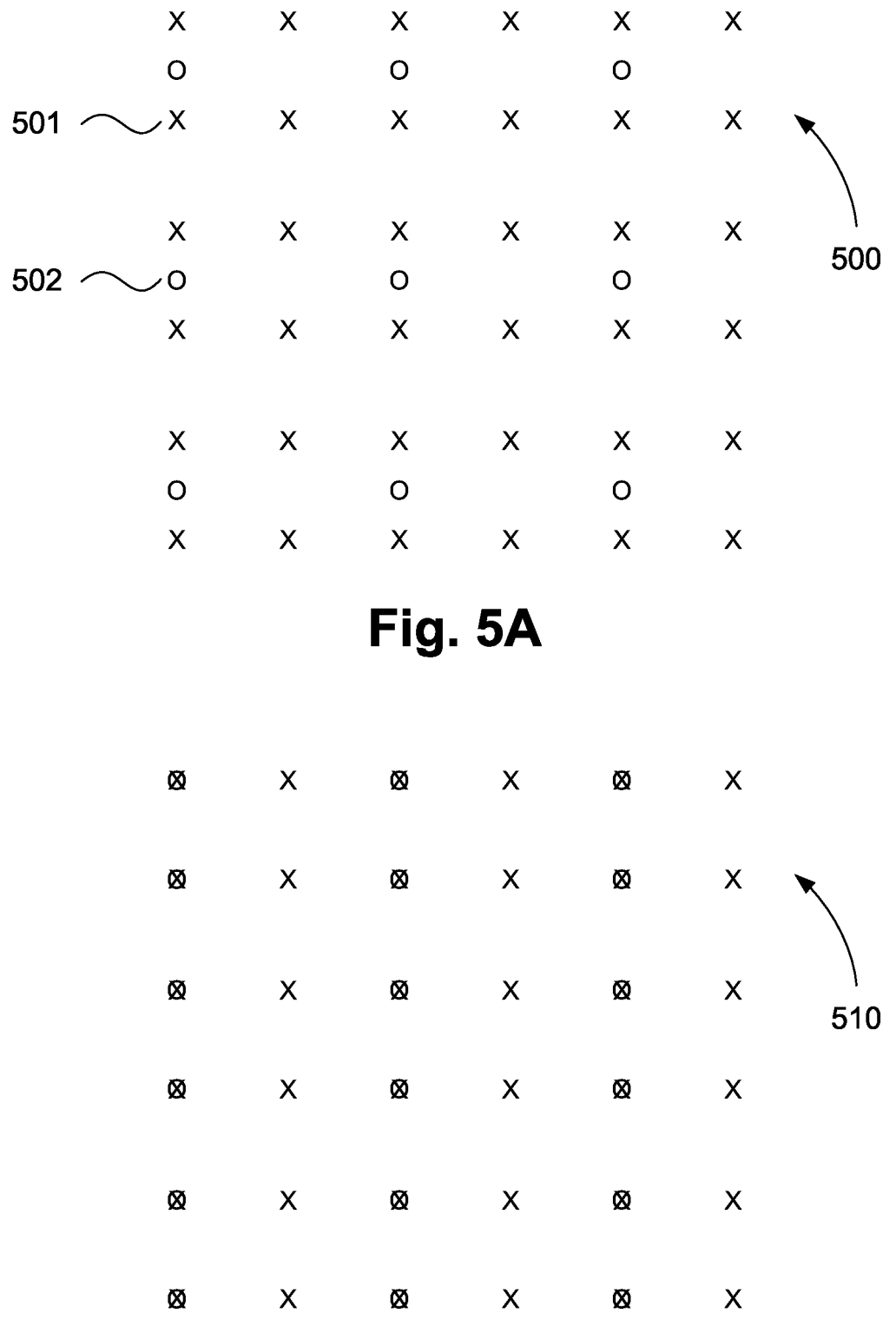

FIGS. 5A and 5B each show sample grids of a frame portion 500 and a frame portion 510 encoded using a 4:2:0 and a 4:2:2 chroma format respectively. The chroma format is specified as a configuration parameter to the video encoder 114 and the video encoder 114 encodes a 'chroma_format_idc' syntax element into the encoded bitstream 312 that specifies the chroma format. The video decoder 134 decodes the 'chroma_format_idc' syntax element from the encoded bitstream 312 to determine the chroma format in use. For example, when a 4:2:0 chroma format is in use, the value of chroma_format_idc is one, when a 4:2:2 chroma format is in use, the value of chroma_format_idc is two and when a 4:4:4 chroma format is in use, the value of chroma_format_idc is three. In FIGS. 5A and 5B, luma sample locations, such as a luma sample location 501, are illustrated using 'X' symbols, and chroma sample locations, such as a chroma sample location 502, are illustrated using 'O' symbols. By sampling the frame portion 500 at the points indicated, a sample grid is obtained for each colour channel when a 4:2:0 chroma format is applied. At each luma sample location X, the luma channel ('Y') is sampled, and at each chroma sample location O, both the chroma channels ('U' and 'V') are sampled. As shown in FIG. 5A, for each chroma sample location, a 2×2 arrangement of luma sample locations exists. By sampling the luma samples at the luma sample locations and chroma samples at the chroma sample locations indicated in the frame portion 510, a sample grid is obtained for each colour channel when a 4:2:2 chroma format is applied. The same allocation of samples to colour channels is made for the frame portion 510 as for the frame portion 500. In contrast to the frame portion 500, twice as many chroma sample locations exist in frame portion 510. In frame portion 510 the chroma sample locations are collocated with every second luma sample location. Accordingly, in FIG. 5B, for each chroma sample location, an arrangement of 2×1 luma sample locations exists.

Various allowable dimensions of transform units were described above in units of luma samples. The region covered by a transform applied for the luma channel will thus have the same dimensions as the transform unit dimensions. As the transform units also encode chroma channels, the applied transform for each chroma channel will have dimensions adapted according to the particular chroma format in use. For example, when a 4:2:0 chroma format is in use, a 16×16 transform unit (TU) will use a 16×16 transform for the luma channel, and an 8×8 transform for each chroma channel. One special case is that when a 4×4 transform is used for the luma channel there is no corresponding 2×2 transform available (when the 4:2:0 chroma format is applied) or 4×2 transform available (when the 4:2:2 chroma format is applied) that could be used for the chroma channels. In this special case, a 4×4 transform for each chroma channel may cover the region occupied by multiple luma transforms.

Figure 6A:
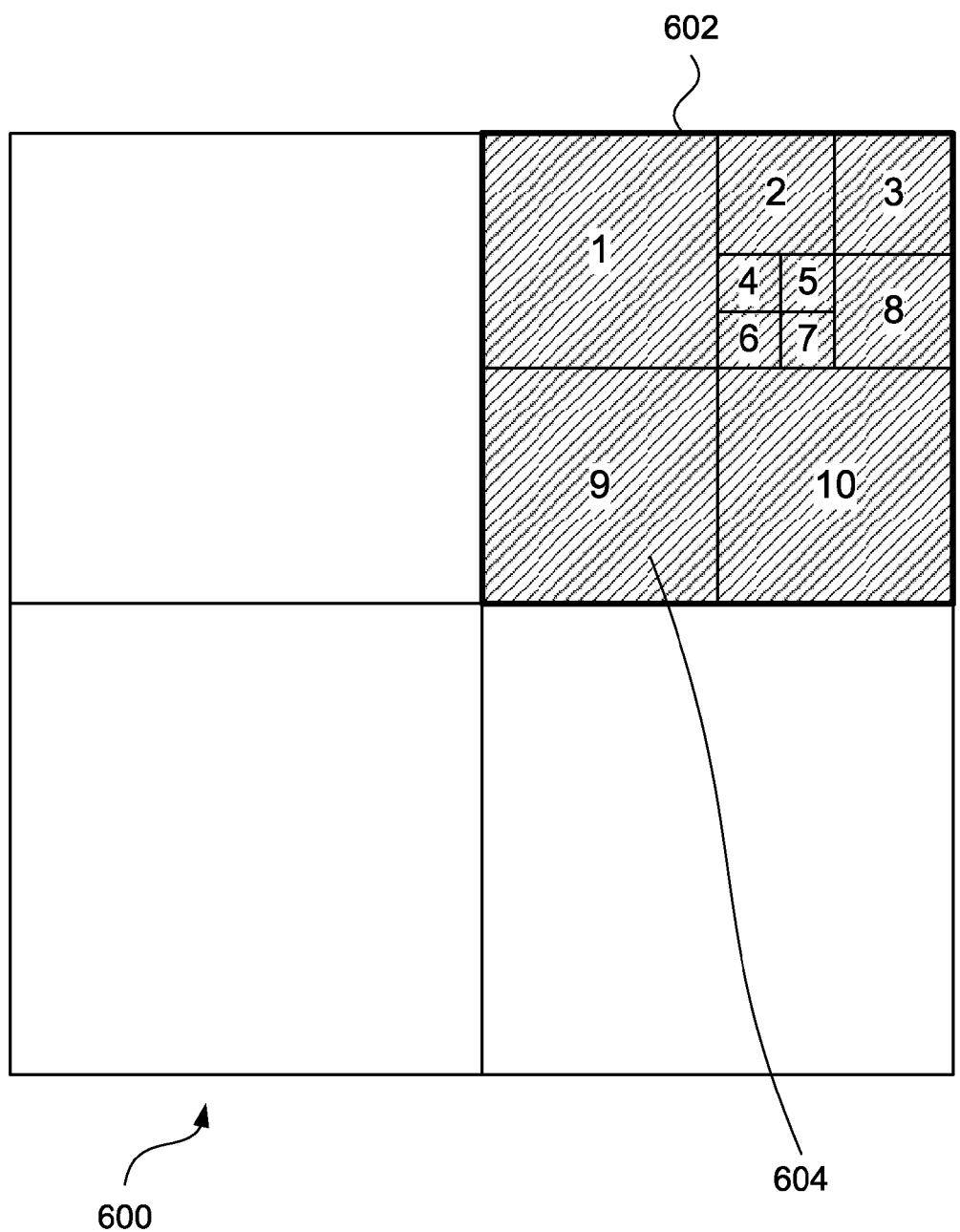
FIG. 6A is a schematic representation of an exemplary transform tree of a coding unit.

FIG. 6A is a schematic representation of an exemplary transform tree of a coding unit (CU) 602 (depicted with a thick border), within a coding tree block (CTB) 600 of the frame. A single quad-tree subdivision divides the coding tree block (CTB) 600 into four 32×32 coding units (CUs), such as the coding unit (CU) 602. An exemplary transform tree exists within the coding unit (CU) 602. The exemplary transform tree includes several quad-tree subdivisions, resulting in ten transform units (TUs) numbered as such in FIG. 6A, for example the transform unit #9 (TU) 604. The transform units #1-#10 cover the entirety of the coding unit (CU) 602. Each quad-tree subdivision divides a region spatially into four quadrants, resulting in four smaller regions. Each transform unit (TU) has a transform depth value, corresponding to a hierarchical level of the transform unit (TU) within the transform tree. The hierarchical level indicates the number of quad-tree subdivisions performed before the quad-tree subdivision terminated, resulting in an instance of a transform unit (TU) that occupies the corresponding region. For example, the transform unit #9 (TU) 604, occupies one quarter of the area of the coding unit (CU) 602 and therefore has transform depth of one. Each transform unit (TU) has an associated size (or 'transform size'), generally described as the dimensions of the region containing the transform unit (TU) on the luma sample grid. The size is dependent on the coding unit (CU) size and the transform depth. Transform units (TUs) with a transform depth of zero have a size equal to the size of the corresponding coding unit (CU). Each increment of the transform depth results in a halving of the size of transform units (TUs) present in the transform tree at the given transform depth. As the frame includes a luma channel and chroma channels, the coding unit (CU) 602 occupies a region on both the luma sample grid and the chroma sample grid and thus each transform unit (TU) includes information describing both the luma samples on the luma sample grid and the chroma samples on the chroma sample grid. The nature of the information for each transform unit (TU) is dependent on the processing stage of the video encoder 114 or the video decoder 134. At the input to the transform module 320 and the output of the inverse scale and transform module 422, the residual sample array 360 and 456 respectively contain information for each transform unit (TU) in the spatial domain. The residual sample array 360 and 456 may be further divided into a 'chroma residual sample array' and a 'luma residual sample array', due to differences in processing between the luma channel and the chroma channels. At the output from the scale and quantise module 322 and the input of the inverse scale and transform module 422, the residual coefficient array 364 and 450 respectively contain information for each transform unit (TU) in the frequency domain. The residual coefficient arrays 364 and 450 may be further divided into a 'chroma residual coefficient array' and a luma residual coefficient array', due to differences in processing between the luma channel and the chroma channels.

Figure 6B:
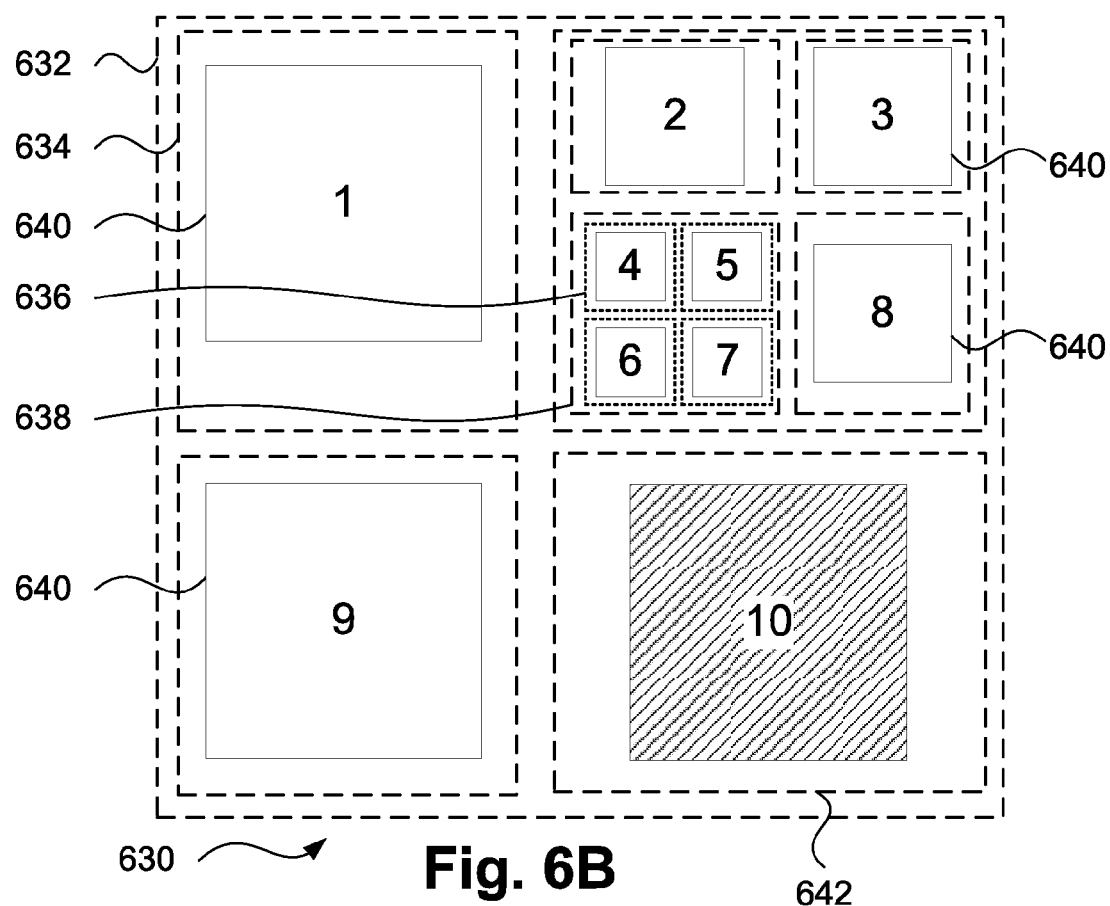
FIG. 6B is a schematic representation of the exemplary transform tree arranged on a luma sample grid.
Figure 7:
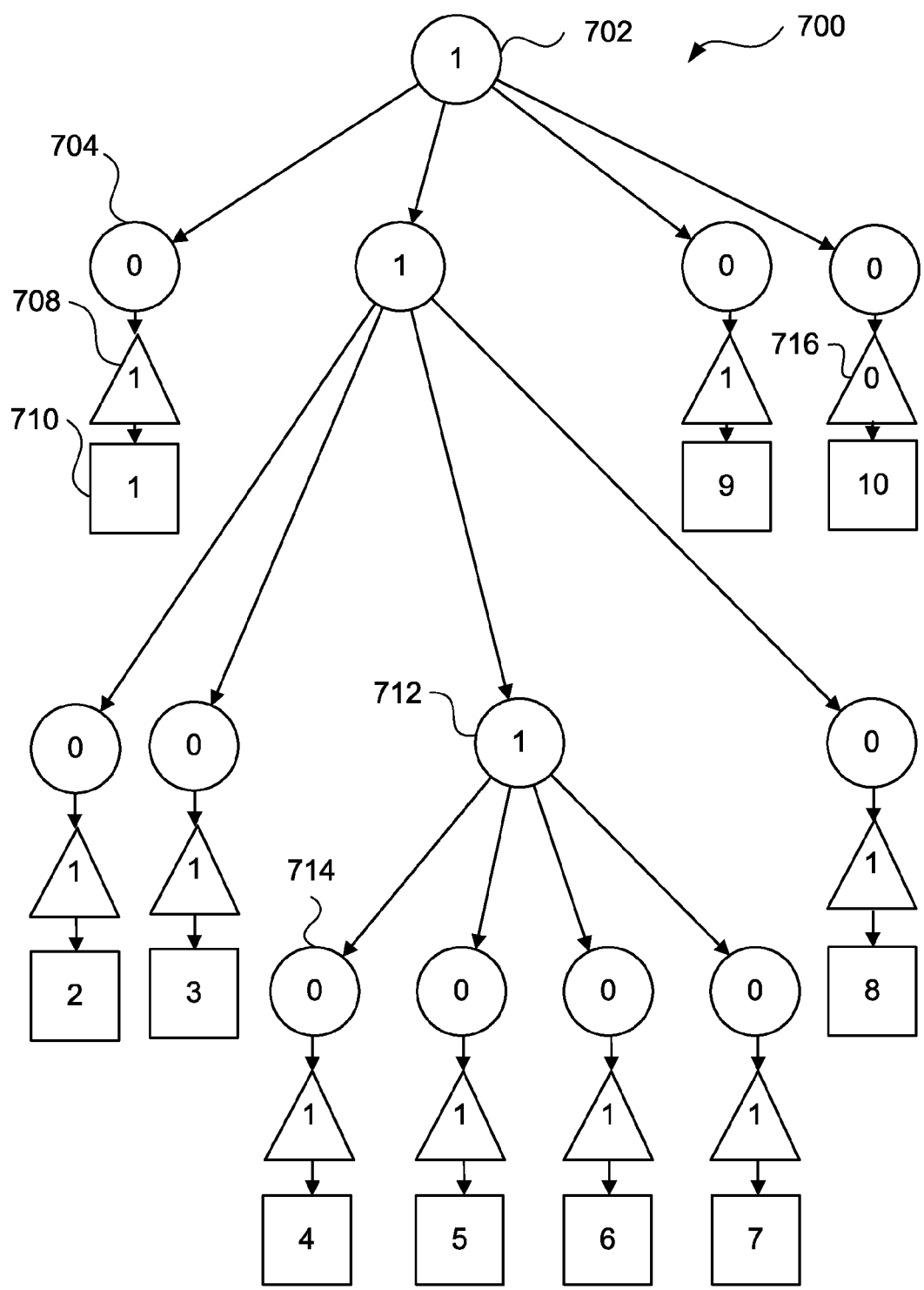
FIG. 7 is a schematic illustration of a data structure representing a luma channel of the exemplary transform tree.

FIG. 6B illustrates an exemplary transform tree 630, corresponding to the exemplary transform tree of FIG. 6A, for the luma channel of a 32×32 coding unit (CU), containing a set of transform units (TUs) and occupying the coding unit (CU) 602, which occupies a 32×32 luma sample array on the luma sample grid. FIG. 7 illustrates a data structure 700 that represents the exemplary transform tree 630. In FIG. 6B, boxes numbered 1 to 10 indicate transform units present within region 632 (exemplified by several transform units (TUs) 640), and each box is contained in a region that is not further sub-divided (indicated by a box with dashed border).

In FIG. 6B, boxes numbered 1 and 9 contain 16×16 transforms for the luma channel, boxes numbered 2, 3 and 8 contain 8×8 transforms for the luma channel and boxes numbered 4 to 7 contain 4×4 transforms for the luma channel. The corresponding region (dashed box) for each of these boxes has coded block flag value of one, to indicate the presence of a transform.

The presence or absence of a transform for each colour channel is specified by a separate coded block flag value which is used in each of encoding and decoding of the bitstream, but which need not be transmitted in the bitstream, as will be discussed below. Consequently, the number of residual coefficient arrays 450 output from the entropy decoder 420 is dependent on the coded block flag values. When no significant coefficients are present in any colour channel, the number of residual coefficient arrays 450 output from the entropy decoder 420 is zero.

In FIG. 7, the circles represent split transform flag values with the split transform flag value being indicated inside the corresponding circle. In FIG. 7, the triangles represent coded block flag values, with the coded block flag value being indicated inside the corresponding triangle. The squares represent transform units, with each transform numbered to accord with the transform numbering present in FIG. 6B.

The uppermost hierarchical level of the exemplary transform tree 630 contains a region 632 occupying a 32×32 coding unit (CU). A split transform flag value 702 indicates that the region 632 is sub-divided into four 16×16 regions, such as a region 634, thus defining a 'non-leaf' node of the exemplary transform tree 630. For each 16×16 region, a further split transform flag value, such as a split transform flag value 704, indicates that the respective 16×16 region should be further sub-divided into four 8×8 regions. For example, the region 634 is not further sub-divided, as indicated by the split transform flag value 704 of zero, thus defining a 'leaf' node of the exemplary transform tree 630. In contrast, a region 638 is further sub-divided into four 4×4 regions (such as a region 636), as indicated by a split transform flag value 712 of one. The recursive split structure present in the transform tree 630 is analogous to the quad-tree split present in the coding tree block (CTB). For the luma channel, at the 'leaf' nodes of the quad-tree, the presence of a transform in the transform unit (TU) is signalled by a coded block flag value, for example a coded block flag value 708 of one indicates the presence of a transform 710 in the region 634.

As a transform may be used to represent residual data in each region, regions are not permitted to be smaller than the smallest supported transform size, such as 4×4 luma samples for the luma channel. Additionally, for regions larger than the largest available transform size, a split transform flag value of one is inferred. For example, for a transform tree with a top level of a 64×64 coding unit, an automatic sub-division (i.e.: not signalled in the encoded bitstream 312) into four 32×32 regions occurs when the largest supported transform size is 32×32 luma samples.

A lower right 16×16 region 642 contains a transform unit (TU) (numbered 10 (ten) and shaded) with no transform for the luma channel and therefore has a corresponding coded block flag value 716 of zero.

Figure 6C:
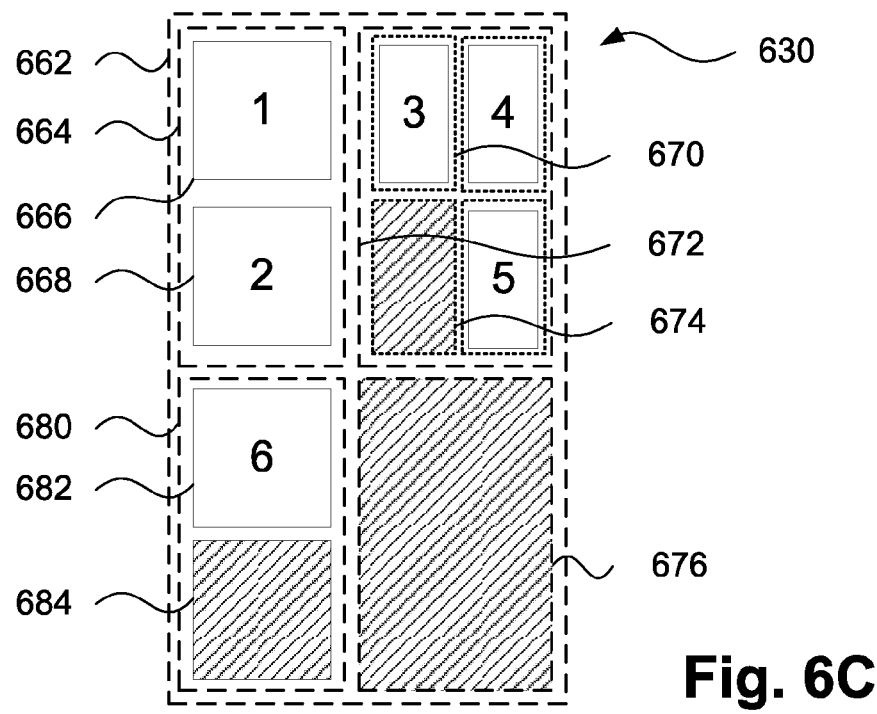
FIG. 6C is a schematic representation of the exemplary transform tree arranged on a chroma sample grid.
Figure 8:
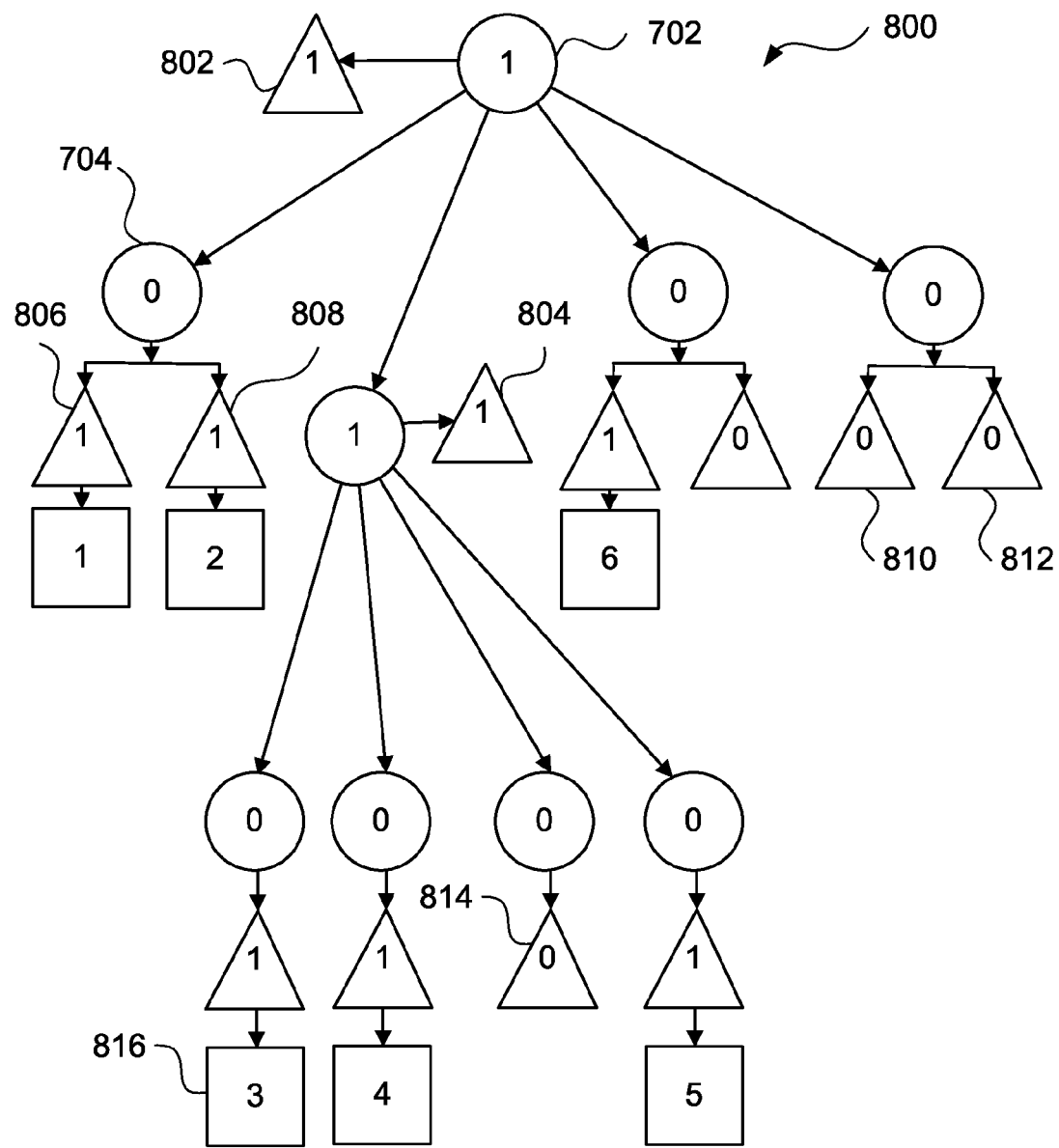
FIG. 8 illustrates a data structure representing a chroma channel of the exemplary transform tree.

FIGS. 6C and 8 illustrate the exemplary transform tree 630, corresponding to the exemplary transform tree of FIG. 6A, for a chroma channel, configured for the 4:2:2 chroma format and containing a set of transforms for a chroma channel corresponding to the transform tree 630 for the luma channel and represented by a data structure 800. As the transform tree hierarchy is common by virtue of the structure of FIG. 6A between the luma channel and the chroma channels, the split transform flag values are shared between the data structures 700 and 800. In contrast to the data structure 700, the data structure 800 includes a coded block flag value with each transform split flag value of one (i.e. on non-leaf nodes of the transform tree). For example, a coded block flag value 802 of one is associated with the transform split flag 702. If the coded block flag value on a non-leaf node of the transform tree is zero, coded block flag values on the child nodes are inferred as zero (and no corresponding coded block flags are encoded in the encoded bitstream 312). Coded block flag values at non-leaf regions enable terminating the encoding of coded block flags at lower levels of the transform tree for each chroma channel if no significant residual coefficients are present in any of the child regions, even though significant residual coefficients may be present in the luma channel. This is a common situation for typical captured frame data, as the majority of information is present in the luma channel.

When the video encoder 114 and the video decoder 134 are configured for a 4:4:4 chroma format, the chroma region of each chroma channel of any given transform unit (TU) of a size that is not one of the predetermined set of transform unit (TU) sizes has identical dimensions to the luma regions of the given transform unit (TU) (i.e.: when an inferred split does not take place). When the video encoder 114 and the video decoder 134 are configured for a 4:4:4 chroma format, the chroma region of each chroma channel of any given transform unit (TU) of a size that is one of the predetermined set of transform unit (TU) sizes has dimensions smaller than to the luma regions of the given transform unit (TU) (i.e.: when an inferred split does take place).

When a 4:2:2 chroma format is in use, this results in the coding unit (CU) 602 including a 16×32 region 662 of FIG. 6C of chroma samples for each chroma channel and thus occupying a 16×32 region on the chroma sample grid. FIG. 6C illustrates the regions on a chroma sample grid, drawn as an array of chroma samples, with each chroma sample equally spaced horizontally and vertically (in contrast to FIG. 5B). Due to the use of the 4:2:2 chroma format, each chroma regions of FIG. 6C appears horizontally compressed with respect to the corresponding luma region of FIG. 6B. The split transform flag value 702 of one divides the 16×32 region 662, corresponding to the coding unit (CU) 602, into four 8×16 regions, such as an 8×16 region 664. The 8×16 region 664 has a non-square shape and is also larger in size than other non-square regions illustrated in FIG. 6C, such as a 4×8 region 670. For each 8×16 region, a split transform flag value, such as the split transform flag value 704, indicates whether the corresponding 8×16 region should be further sub-divided into four smaller 4×8 regions, in an analogous manner to the quad-tree splitting present in the transform tree 630 for the luma sample array. An upper right 8×16 region 672 is further sub-divided into four 4×8 regions. A coded block flag value 804 of one indicates that each of the four 4×8 regions could contain significant residual coefficients. A coded block flag for each 4×8 region is thus required to indicate the presence of a transform for the corresponding region. Of these four 4×8 regions, a lower left 4×8 region 674 (shaded) contains a transform unit (TU) but does not contain a transform and therefore has a coded block flag value 814 of zero. The remaining 4×8 regions, such as the region 670, each have a transform and therefore have corresponding coded block flag values of one. The upper left 8×16 region is sub-divided into two equal-sizes 8×8 regions. In contrast to the quad-tree subdivision, no corresponding split transform flag is present in the encoded bitstream 312.

Splitting a region of a channel, such as a chroma channel, of a transform unit (TU) into multiple regions (each of which may have a transform), without signalling being present in the encoded bitstream 312, is referred to as an 'inferred split'. The inferred split eliminates the need to introduce hardware supporting a non-square transform for this case (8×16). Instead, transforms, such as a first 8×8 transform 666, are used. As it is possible for each of the regions resulting from the inferred split to contain all zero residual information, it is necessary to specify the presence of a transform in each region resulting from the inferred split. Accordingly, separate coded block flag values are required for each region resulting from an inferred split. In this case, coded block flag values 806 and 808 correspond to the first 8×8 transform 666 and a second 8×8 transform 668 respectively. For transform units (TUs) where no inferred split takes place, a coded block flag value for each chroma channel specifies the presence or absence of a transform for the region occupied by the transform unit (TU) for the chroma channel. When an inferred split takes place, a separate coded block flag value (not illustrated in FIG. 8) is required for each of the resulting regions, however implementations may retain a coded block flag value attributable to the entire transform unit (TU). The separate coded block flag value could be inferred as 'one' in all cases, or the separate coded block flag value could be determined by performing a logical 'OR' operation to the coded block flag value of each region resulting from the split. If the separate coded block flag value is determined from the coded block flag value of each region resulting from the split, the separate coded block flag value may be encoded in the encoded bitstream 312 by the entropy encoder 324 and decoded from the encoded bitstream 312 by the entropy decoder 420 as an additional coded block flag (not illustrated in FIG. 9). In such a case, when the separate coded block flag value is zero, the coded block flag value of each region from the split may be inferred to be zero and when the separate coded block flag value is one, the coded block flags for each region from the split are encoded in the encoded bitstream 312 by the entropy encoder 324 and decoded from the encoded bitstream 312 by the entropy decoder 420.

The lower left 8×16 region 680 of the 16×32 region 662 illustrates an inferred split where an 8×8 transform is present in the upper 8×8 inferred region 682 but no 8×8 transform is present in the lower 8×8 inferred region 684. A lower right 8×16 array 676 (shaded) contains a transform unit (TU) but does not contain a transform in either square 8×8 region resulting from the inferred split and therefore has coded block flag values 810 812 of zero.

The presence of two chroma channels results in a duplication of the structure depicted in FIG. 6C, with separate coded block flag values used to specify the presence of transforms for each chroma channel. In this implementation, a split was inferred for region sizes for chroma other than the size 4×8, resulting in using a 4×8 rectangular transform, such as a 4×8 transform 816 (contained in region 670), and enabling reuse of existing square transforms in other cases (e.g. 8×8, 16×16). Thus, a set of predetermined region sizes (such as 8×16 and 16×32) may be said to exist, for which a split into two regions, and hence two transforms (of sizes 8×8 and 16×16), can be used. Different definitions of the predetermined set of region sizes for which an inferred split occurs are also possible and will allow a different combination of existing square transforms and rectangular transforms to be used. It is also possible for certain implementations to always infer a split, in which case no rectangular transform is introduced for the chroma 4:2:2 colour channels. In such a case, the predetermined set of region sizes for which an inferred split occurs contains all possible chroma region sizes (e.g. 4×8, 8×16 and 16×32 for a 4:2:2 chroma format or 4×4, 8×8, 16×16 and 32×32 for a 4:4:4 chroma format).

When a 4:2:0 chroma format is in use, an inferred split does not take place for either chroma region in the transform unit (TU), therefore the maximum number of transforms for each chroma channel is always one (the coded block flag value for each chroma channel controls whether the chroma transform occurs).

Although the video encoder 114 and the video decoder 134 are described independently of differences between the luma and chroma channels, the differing sample grids resulting from the chroma formats necessitates the need for differences in the modules. Practical implementations may have a separate 'processing paths' for the luma channel and for the chroma channels. Such an implementation may thus decouple processing of luma samples and chroma samples. As the encoded bitstream 312 is a single bitstream for both the luma and chroma channels, the entropy encoder 324 and the entropy decoder 420 are not decoupled. Additionally, a single frame buffer, such as the frame buffer 332 432 holds luma and chroma samples and is thus not decoupled. However, the modules 322-330 and 334-340 and the modules 422-430 and 434 may have luma and chroma processing decoupled, enabling implementations to have separate logic for luma and chroma, thus creating a luma processing path' and a 'chroma processing path'.

Certain implementations may infer a split for the 16×32 region of a chroma channel of a transform unit (TU) into two 16×16 regions, but not infer a split for the 8×16 and 4×8 cases. Such implementations avoid the need to introduce 32-point transform logic into the chroma processing path, instead being able to rely on 4, 8 or 16-point transform logic well-established in the art.

Figure 9A:
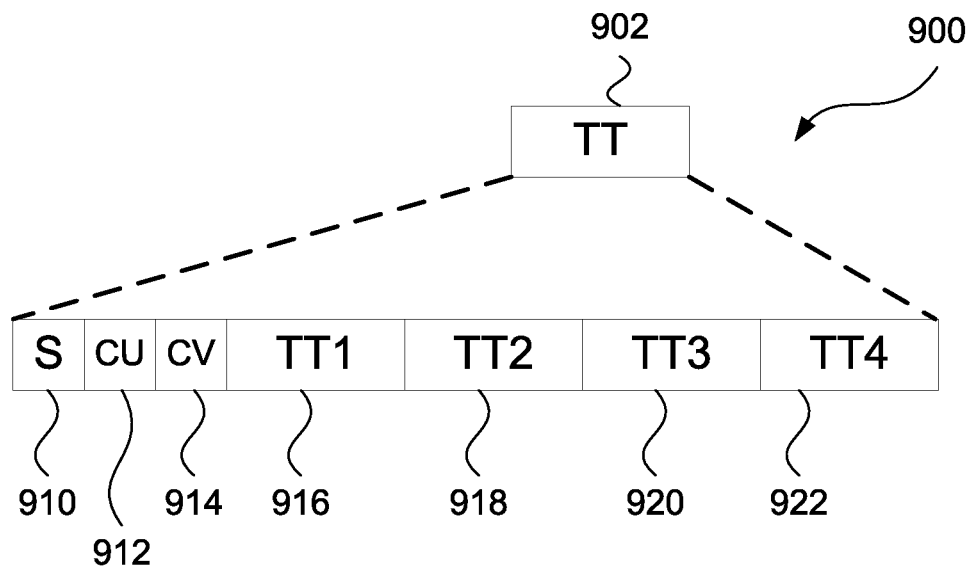
FIGS. 9A and 9B schematically show a bitstream structure that encodes the exemplary transform tree.
Figure 9B:
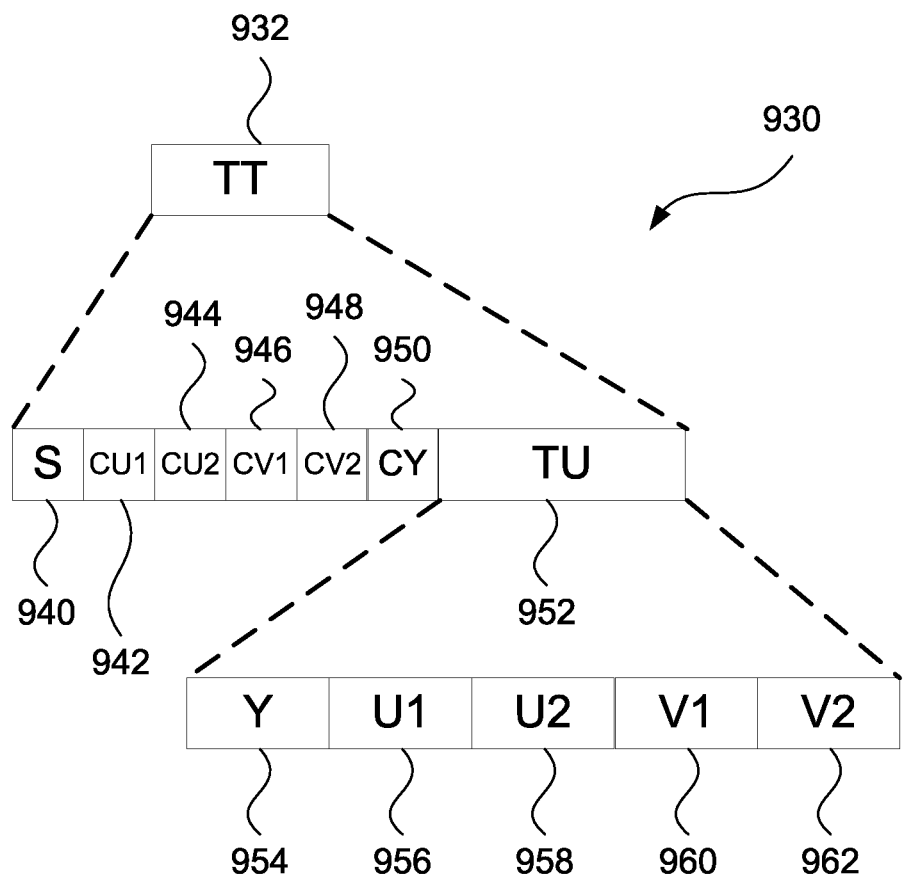

FIGS. 9A and 9B illustrate a syntax structure that can be used to encode or otherwise represent a hierarchical level of the transform tree. At non-leaf nodes of a transform tree, a syntax structure 900 is expanded recursively in accordance with data structures, such as the data structures 700 and 800, to define the syntax elements present in a portion of the encoded bitstream 312 corresponding to the transform tree. At leaf nodes of a transform tree (where no further sub-division takes place in the transform tree) a syntax structure 930 defines syntax elements present in the portion of the encoded bitstream 312. Typically, one data structure for luma and two data structures for chroma are present, although additional data structures are possible, such as for encoding an alpha channel or a depth map. Alternatively, fewer data structures may be utilised, such as in the case where a single data structure is shared by the chroma channels and coded block flag values are able to be shared between the chroma channels. A transform tree non-leaf node syntax structure 902 defines the encoding of one hierarchical level of a transform tree, such as the transform tree 630. A split transform flag 910 encodes a split transform flag value of one, such as the split transform flag value 702. This value indicates that the transform tree non-leaf node syntax structure 902 includes a lower hierarchical level that contains additional instances of the transform tree non-leaf node syntax structure 902 or transform tree leaf-node syntax structure 932, or 'child nodes'. A coded block flag 912 encodes the coded block flag value 802 of one for the 'U' chroma channel and a coded block flag 914 encodes a further coded block flag value for the 'V' chroma channel. If the transform tree non-leaf node syntax structure 902 is defining the top level of the transform tree hierarchy then the coded block flags 912 914 are present. If the transform tree non-leaf node syntax structure 902 is not defining the top level of the transform tree hierarchy then the coded block flags 912 914 are only present if the corresponding coded block flags in the parent level of the transform tree hierarchy are present and one-valued. As a lower hierarchical level exists in the transform tree 630 (relative to the top hierarchical level), a quad-tree sub-division takes place. This sub-division results in four transform tree syntax structures 916, 918, 920, 922 being included in the transform tree non-leaf node syntax structure 902.

The syntax structure 930 defines the encoding of the leaf node of the transform tree leaf node 932 (i.e. where no further sub-division takes place). A split transform flag 940 encodes a split transform flag value of zero, such as the split transform flag value 704.

A split transform flag is only encoded if the corresponding region is larger than a minimum size. For example, the region 636 has the smallest allowable size for a region of 4×4 luma samples (corresponding to the smallest supported luma transform size) so a transform split flag value 714 is inferred as zero and no split transform flag is encoded for the corresponding transform tree syntax structure.

For the region 636, chroma residual samples are transformed using a 4×8 chroma transform, hence no inferred transform split is present. Coded block flags, such as a coded block flag 942 and a coded block flag 946 may be present to signal the presence of a transform for each of the chroma channels. A coded block flag 950 signals the presence of a transform for the luma channel. Residual coefficients for the luma and chroma channels (if present) are present in a transform unit (TU) syntax structure 952. If the value of the coded block flag 950 is one, a luma residual block 954 is present in the encoded bitstream 312. If the value of the coded block flag for each chroma channel is one, corresponding chroma residual blocks 956 and 960 are present in the encoded bitstream 312.

For the region 664, chroma residual samples are transformed using two 8×8 chroma transforms, hence an inferred transform split is present. The coded block flags 942 and 946, if present, signal the presence of 8×8 transforms for each chroma channel of the first 8×8 transform 666. A coded block flag 944 and a coded block flag 948, if present, signal the presence of 8×8 transforms for each chroma channel of the second 8×8 transform 668. If the value of the coded block flag 944 is one, a chroma residual block 958 is present in the encoded bitstream 312. If the value of the coded block flag 948 is one, a chroma residual block 962 is present in the encoded bitstream 312.

The syntax structure 930 as illustrated in FIG. 9B, shows the first and second transform of each chroma channel encoded adjacently for the inferred transform split. Other arrangements, such as encoding syntax elements for each chroma channel adjacently, or encoding syntax elements for each chroma channel interspersed with other syntax elements, may alternatively be used.

Figure 9C:
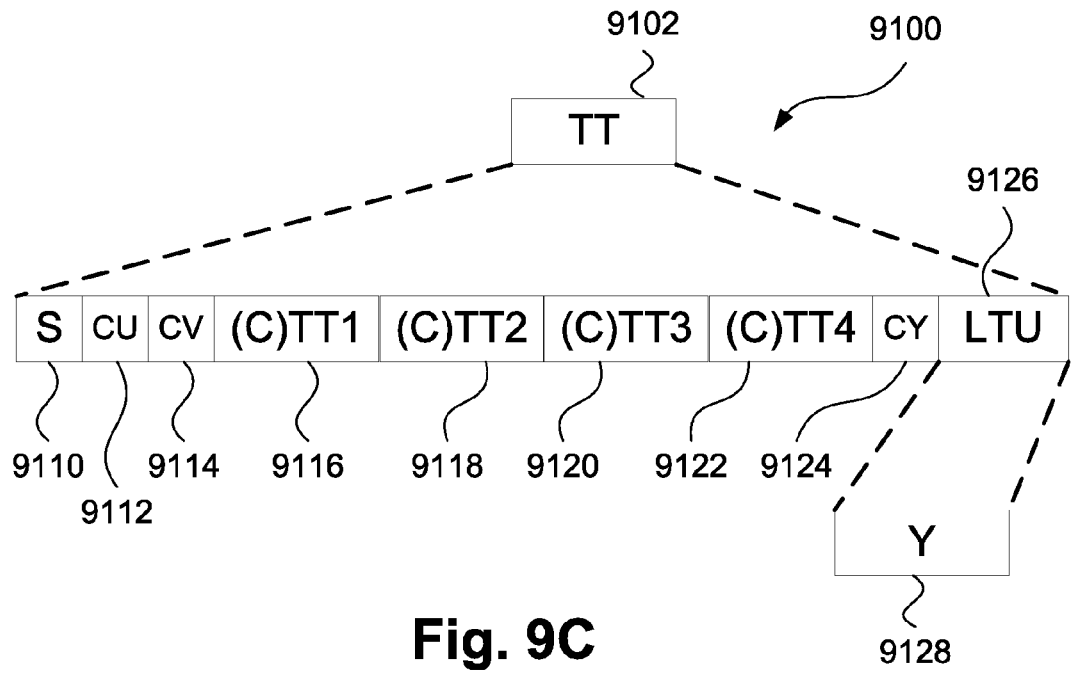
FIGS. 9C and 9D schematically show an alternative bitstream structure that encodes the exemplary transform tree.
Figure 9D:
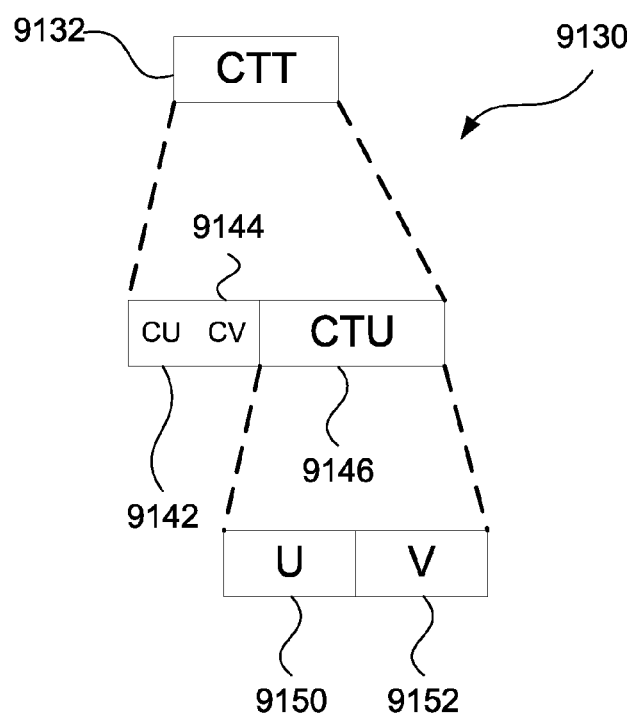

FIGS. 9C and 9D illustrate an alternative syntax structure 9100 that can be used to encode or otherwise represent a hierarchical level of the transform tree. At non-leaf nodes of a transform tree, the alternative syntax structure 9100 is expanded recursively in accordance with data structures, such as the data structures 700 and 800, to define the syntax elements present in a portion of the encoded bitstream 312 corresponding to the transform tree. An instance of the alternative syntax structure 9100 exists for each node in the transform tree, including the leaf nodes, which each contain a transform unit (TU). Where an 'inferred split' occurs to sub-divide the transform unit (TU) for each chroma channel, a syntax structure 9130 defines syntax elements present in the portion of the encoded bitstream 312. Typically, one data structure for luma and two data structures for chroma are present, although additional data structures are possible, such as for encoding an alpha channel or a depth map. Alternatively, fewer data structures may be utilised, such as in the case where a single data structure is shared by the chroma channels and coded block flag values are able to be shared between the chroma channels. A transform tree syntax structure 9102 defines the encoding of one hierarchical level of a transform tree, such as the transform tree 630.

For an instance of the transform tree syntax structure 9102 at a non-leaf node of a transform tree, such as the transform tree 630, a split transform flag 9110 encodes a split transform flag value of one, such as the split transform flag value 702. This value indicates that the instance of the transform tree syntax structure 9102 includes a lower hierarchical level, containing additional instances of the transform tree syntax structure 9102 or 'child nodes'. A coded block flag 9112 encodes a coded block flag value in accordance with the description of the coded block flag 912. A coded block flag 9114 encodes a coded block flag value in accordance with the description of the coded block flag 914. As a lower hierarchical level exists in the transform tree 630 (relative to the top hierarchical level), a quad-tree sub-division takes place. This sub-division results in four transform tree syntax structures 9116, 9118, 9120, 9122 being included in the transform tree node syntax structure 9102. Each of the transform tree syntax structures 9116, 9118, 9120, 9122 is another instance of the transform tree syntax structure 9102. A coded block flag 9124 and a luma transform unit portion 9126 will be absent from the transform tree syntax structure 9102.

Implementations may also arrange the transform tree syntax structure 9102 such that the coded block flag 9124 and the luma transform unit portion 9126 (if present) are placed earlier in the transform tree syntax structure 9102, such as in between the coded block flag 9114 and the transform tree syntax structure 9116.

For an instance of the transform tree syntax structure 9102 at a leaf node of a transform tree, such as the transform tree 630, a split transform flag 9110 encodes a split transform flag value of zero, such as the split transform flag value 704. The instance of the transform tree syntax structure 9102 thus corresponds to a transform unit (TU) in the transform tree 930. The transform unit (TU) has a size determined in accordance with the coding unit (CU) containing the transform unit (CU), such as the coding unit (CU) 602, and the transform depth. The coded block flag 9112 encodes a coded block flag value of one to indicate that any of the chroma regions resulting from the inferred split for the 'U' chroma channel may have a coded block flag value of one. If the coded block flag 9112 encodes a value of zero, then the coded block flag value for each chroma region resulting from the inferred split for the 'U' chroma channel have a coded block flag value inferred as zero. Even when the code block flag 9112 encodes a value of one, implementations may still encode a coded block flag having a value of zero for each chroma region resulting from the inferred split. Therefore, implementations may omit the coded block flag 9112 from the encoded bitstream 312, instead always inferred a coded block flag value of one for the omitted coded block flag 9112. The coded block flag 9114 encodes a further coded block flag value for the 'V' chroma channel in a similar manner to the coded block flag 9112. For transform unit (TU) sizes that accord with those for which an inferred split into four chroma regions occurs (a maximum number of chroma residual coefficient arrays is four), the four transform tree syntax structures 9116 9118 9120 9122 are included in the transform tree node syntax structure 9102. For transform unit (TU) sizes that accord with those for which an inferred split into two chroma regions occurs (a maximum number of chroma residual coefficient arrays is two), two transform tree syntax structures, such as transform tree syntax structures 9116 9118 are included in the transform tree node syntax structure 9102. Each of the transform tree syntax structures 9116 9118 9120 9122 is an instance of a transform tree for chroma syntax structure 9132. The coded block flag 9124 encodes a coded block flag value, such as the coded block flag value 708, specifying the presence of absence of a transform for the luma channel of the transform unit (TU). The luma portion of the transform unit 9126 encodes a luma residual coefficient array as luma residual syntax elements 9128.

The transform tree for chroma syntax structure 9132, only existing for each chroma region when an inferred split takes place, includes a reduced set of the syntax of the transform tree syntax structure 930. A coded block flag 9142 encodes a coded block flag value for the 'U' chroma channel of the chroma region. A coded block flag 9144 encodes a coded block flag value for the 'V' chroma channel of the chroma region. A chroma portion of the transform unit (TU) 9146, encodes a subset of the transform unit (TU) syntax structure 952. The chroma portion of the transform unit (TU) 9146 encodes a chroma residual coefficient array as chroma residual syntax elements 9150 for the 'U' chroma channel if the value of the coded block flag 9142 is one. The chroma portion of the transform unit (TU) 9146 encodes a chroma residual coefficient array as chroma residual syntax elements 9152 for the 'V' chroma channel if the value of the coded block flag 9144 is one.

The syntax structure 9130 as illustrated in FIG. 9D shows the first and second coded block flag encoded adjacently followed by the first and second chroma residual coefficient array of each chroma channel for the inferred transform split. Other arrangements, such as encoding the coded block flag and the chroma residual coefficient array adjacently for each chroma channel may alternatively be used.

Although the inferred transform split is illustrated with the 8×16 region 664 split into two 8×8 regions, alternative implementations may perform the split for other regions. For example, some implementations may infer a split of a 16×32 region into two 16×16 regions. Such implementations advantageously avoid the need for a 32-point 1D transform in the chroma processing path. Since the 32-point 1D transform is not required for the chroma processing path when the 4:2:0 chroma format is applied, the requirement for the 32-point 1D transform is entirely removed from the chroma processing path. Implementations that use separate processing circuitry to decouple the luma and chroma channels may thus achieve a lower implementation cost in the chroma processing circuitry.

A 4:4:4 chroma format exists where there is one chroma sample location for each luma sample location. Accordingly, with this format, transforms for the chroma channel and the luma channel may have the same sizes. With a largest transform size of 32×32 in the luma processing path, this would require introducing a 32×32 transform into the chroma processing path for a decoupled implementation. Specific implementations may infer a split for each chroma channel to split a 32×32 region into four 16×16 regions, enabling reuse of the existing 16×16 transform in the chroma processing path. Since a 32×32 transform would only be used in the chroma processing path for the 4:4:4 chroma format, inferring a split for each chroma channel to split a 32×32 region into four 16×16 regions would enable the 32×32 transform to be removed from the chroma processing path, reducing the processing circuitry required. Such implementations would require four coded block flag values for each chroma channel, and thus up to four coded block flags coded in the syntax structure 930 for each chroma channel in the encoded bitstream 312.

Implementations supporting a 4:2:2 chroma format may also infer a split for each chroma channel to split a 32×16 region into four 8×16 regions. Such implementations require four coded block flag values for each chroma channel, and thus four coded block flags coded in the syntax structure 930 for each chroma channel in the encoded bitstream 312, thus a 'CU3', 'CU4', 'CV3' and 'CV4' coded block flag (not illustrated in FIG. 9B) may be introduced in the transform unit (TU) syntax structure 952. Such implementations avoid introducing 32-point transform logic into the chroma processing path and, where 8×16 regions are not sub-divided, may reuse 8×16 transform logic required for transform units (TUs) of size 16×16 (in the luma channel) that require transforming transform of size 8×16 for the chroma channels.

Figure 10:
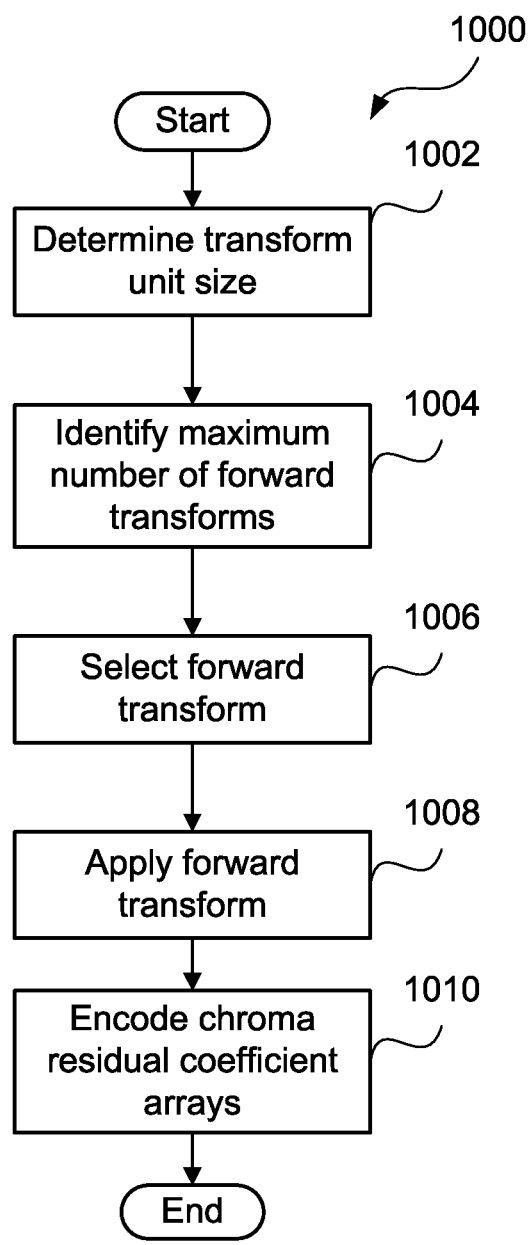
FIG. 10 is a schematic flow diagram showing a method for encoding the exemplary transform tree.

FIG. 10 is a schematic flow diagram showing a method 1000 for encoding a transform unit (TU) by encoding the transform tree non-leaf node syntax structure 902 and the transform tree leaf node syntax structure 932. The method 1000 is described with reference to a chroma channel of the transform unit (TU) however the method 1000 may be applied to any chroma channel of the transform unit (TU). As the transform tree non-leaf node syntax structure 902 and the transform tree leaf node syntax structure 932 describe one node in the transform tree, the method 1000 encodes one node of the transform tree into the encoded bitstream 312. The method 1000 may be implemented in hardware or by software executable on the processor 205, for example. The method 1000 is initially invoked for the top level of the transform tree and is capable of invoking itself (recursively) to encode child nodes of the transform tree. A determine transform unit size step 1002 determines the size of a transform unit (TU) in a transform tree according to the coding unit (CU) size that contains the transform tree and a transform depth value of the transform unit (TU). When the method 1000 is invoked at the top level of the transform tree, the transform depth value is set to zero, otherwise the transform depth value is provided by the parent instance of the method 1000. A split transform flag value, such as the split transform flag value 702 is encoded in the encoded bitstream 312 as split transform flag 910 if the transform depth value is less than the maximum allowed transform depth.

When the split transform flag value is one, chroma coded block flags 912 and 914 are encoded for each chroma channel only if the parent node of the transform tree hierarchy has a corresponding coded block flag value of one. The method 1000 then invokes a new instance of the method 1000 for each child node (represented in the portion of the encoded bitstream 312 by transform tree syntax structures 916, 918, 920 and 922) of the transform tree. Each instance of the method 1000, invoked for the child nodes, is provided with a transform depth value equal to the present method 1000 instance transform depth value incremented by one.

When the split transform flag value is zero, an identify maximum number of forward transforms step 1004 determines a maximum number (n) of transforms for each chroma channel of the region being encoded. When no inferred split takes place, this number n will be one. When a 4:2:2 chroma format is in use and a rectangular region of a chroma channel, such as the 8×16 region 664, is encountered and the region size is one of a predetermined set of region sizes (such as 16×32 and 8×16), an inferred split takes place and the maximum number of transforms will be two (otherwise the number of transforms will be one). Otherwise (the region size is not one of a predetermined set of region sizes) the maximum number of transforms will be one. For example, if 4×8 is not one of the predetermined set of region sizes, then the maximum number of transforms will be one. When a 4:4:4 chroma format is in use and the encountered region size is one of a predetermined set of region sizes (such as a 32×32 region), an inferred split takes place and the maximum number of transforms will be four. Otherwise (the region size is not one of a predetermined set of region sizes) the maximum number will be one. For example, if 8×8 is not one of the predetermined set of region sizes, then the maximum number of transforms will be one. Although the predetermined set of region sizes includes 8×16, other predetermined set of region sizes are possible, such as only 16×32 when a 4:2:2 chroma format is in use or 32×32 when a 4:4:4 chroma format is in use.

For each chroma channel, if the parent node had a coded block flag value of one, then for each of n, a coded block flag is encoded in the encoded bitstream 312. For example, when the number of transforms is equal to two, coded block flags 942 and 944 indicate the presence of a transform for each of the two regions inferred by the split. A select forward transform step 1006 selects a forward transform from a predetermined set of forward transforms, for each of the maximum number of transforms, based on a transform unit (TU) size, which is in turn dependent on the transform depth, and thus related to a hierarchical level of the transform unit in the largest coding unit. When the transform depth is equal to zero, the transform unit (TU) size is equal to the coding unit (CU) size. For each increment of the transform depth, the transform unit (TU) size is halved. For a 32×32 coding unit (CU) size, a transform depth of zero and using a 4:2:2 chroma format, the transform unit (TU) size will thus be 32×32 and the transform size for chroma will thus be 16×32. For example, when the maximum number of transforms is two and the region size for chroma is 16×32, then a 16×16 forward transform is selected for each of the 16×16 regions for chroma resulting from the inferred split.

An apply forward transform step 1008 performs the forward transform for each of the maximum number of transforms on the corresponding region that has a coded block flag value of one. The encode chroma residual sample arrays step 1008 is generally performed by the transform module 320. This results in a conversion of each chroma residual sample array (spatial domain representation) into a chroma residual coefficient array (frequency domain representation).

An encode chroma residual coefficient arrays step 1010 encodes the chroma residual coefficient array for each of the maximum number of transform regions of each chroma channel having a coded block flag value of one into the encoded bitstream 312. The number of chroma residual coefficient arrays encoded for a given transform unit for a given chroma channel depends on the coded block flag value of each transform and will thus vary from zero to (at most) the maximum number of transforms. For example, when the number of transforms is two and both chroma channels have coded block flag values of one for each of the count values, then the chroma residual blocks 956, 958, 960 and 962 are encoded in the encoded bitstream 312. If the coded block flag value for each transform for a given chroma channel is zero, then no chroma residual block is encoded in the encoded bitstream 312 for that chroma channel. The encode chroma residual coefficient arrays step 1010 is generally performed by the entropy encoder 324.

Figure 11:
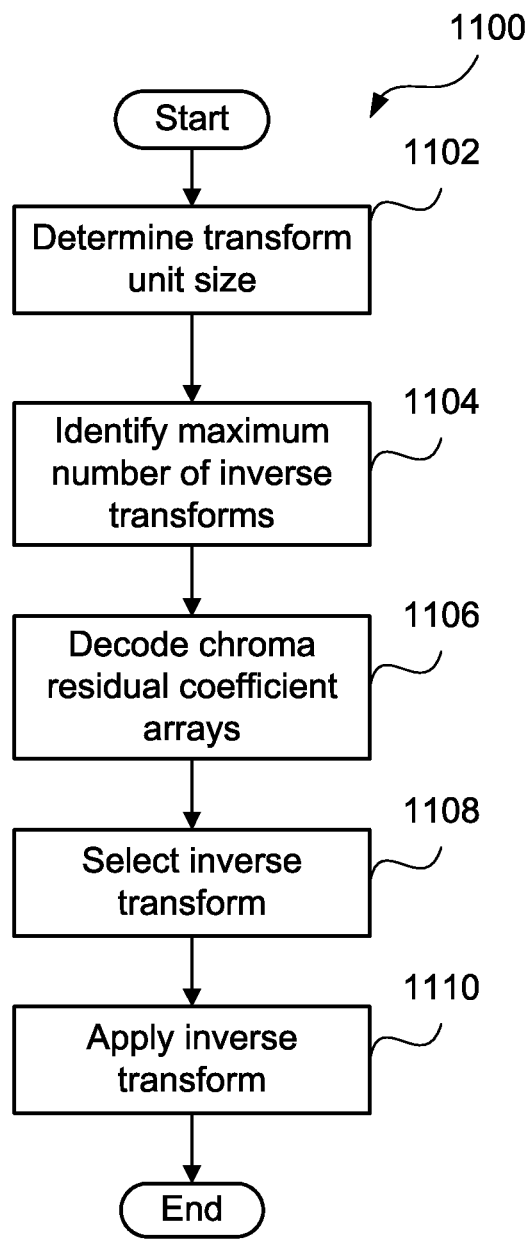
FIG. 11 is a schematic flow diagram showing a method for decoding the exemplary transform tree.

FIG. 11 is a schematic flow diagram showing a method 1100 for decoding a transform unit (TU) by decoding the transform tree non-leaf node syntax structure 902 and the transform tree leaf node syntax structure 932. The method 1100 is described with reference to a chroma channel of the transform unit (TU) however the method 1100 may be applied to any chroma channel of the transform unit (TU). As the transform tree non-leaf node syntax structure 902 and the transform tree leaf node syntax structure 932 describe one node in the transform tree, the method 1100 decodes one node of the transform tree from the encoded bitstream 312. The method 1100 may be performed in appropriate hardware or alternatively in software, for example executable by the processor 205. The method 1100 is initially invoked for the top level of the transform tree and is capable of invoking itself (recursively) to decode child nodes of the transform tree. A determine transform unit (TU) size step 1102 determines a transform unit (TU) size in a manner identical to the determine transform unit size step 1002. The determine transform unit size step 1102 determines the size of a transform unit (TU) in a transform tree according to the coding unit (CU) size that contains the transform tree and a transform depth value of the transform unit (TU). When the method 1100 is invoked at the top level of the transform tree, the transform depth value is set to zero, otherwise the transform depth value is provided by the parent instance of the method 1100. A split transform flag value, such as the split transform flag value 702 is decoded from the encoded bitstream 312 as split transform flag 910 if the transform depth value is less than the maximum allowed transform depth.

When the split transform flag value is one, chroma coded block flags 912 and 914 are decoded for each chroma channel only if the parent node of the transform tree hierarchy has a corresponding coded block flag value of one. The method 1100 then invokes a new instance of the method 1100 for each child node (represented in the portion of the encoded bitstream 312 by transform tree syntax structures 916, 918, 920 and 922) of the transform tree. Each instance of the method 1100, invoked for the child nodes, is provided with a transform depth value equal to the present method 1100 instance transform depth value incremented by one.

When the split transform flag value is zero, an identify maximum number of inverse transforms step 1104 determines a (maximum) number (n) of transforms for each of the at least one chroma residual coefficient arrays present in each chroma channel of the region being decoded, in a manner identical to the identify maximum number (n) of forward transforms step 1004. When no inferred split takes place, this number n will be one. When a 4:2:2 chroma format is in use and a rectangular region of a chroma channel, such as the 8×16 region 664, is encountered and the region size is one of a predetermined set of region sizes (such as 16×32 and 8×16), an inferred split takes place and the maximum number of transforms will be two (otherwise the number of transforms will be one). Otherwise (the region size is not one of a predetermined set of region sizes) the maximum number of transforms will be one. For example, if 4×8 is not one of the predetermined set of region sizes, then the maximum number of transforms will be one. When a 4:4:4 chroma format is in use and the encountered region size is one of a predetermined set of region sizes (such as a 32×32 region), an inferred split takes place and the maximum number of transforms will be four. Otherwise (the region size is not one of a predetermined set of region sizes) the maximum number will be one. For example, if 8×8 is not one of the predetermined set of region sizes, then the maximum number of transforms will be one. Although the predetermined set of region sizes includes 8×16, other predetermined set of region sizes are possible, such as only 16×32 when a 4:2:2 chroma format is in use or 32×32 when a 4:4:4 chroma format is in use. For each chroma channel, if the parent node had a coded block flag value of one, then for each of the (n) transforms, a coded block flag is decoded in the encoded bitstream 312. For example, when the maximum number of transforms is equal to two, coded block flags 942 and 944 indicate the presence of a transform for each of the two regions inferred by the split.

A decode chroma residual coefficient arrays step 1106 then decodes the residual coefficient array for each of the maximum number of transforms regions of each chroma channel from the encoded bitstream 312 having a coded block flag value of one. The number of residual coefficient arrays decoded for a given transform unit for a given chroma channel depends on the coded block flag value of each transform and will thus vary from zero to (at most) the 'number (n) of transforms'. For example, when the number of transforms is two and both chroma channels have coded block flags of one for each of the count values, then the chroma residual blocks 956, 958, 960 and 962 are decoded from the encoded bitstream 312. The decode chroma residual coefficient arrays step 1106 is generally performed by the entropy decoder 420 for each chroma residual coefficient array having a coded block flag value of one.

A select inverse transform step 1108 then selects an inverse transform from a predetermined set of inverse transforms, for each of the maximum number of transforms having a coded block flag value of one for each chroma channel. For example, when the maximum number of transforms is two and the region size is 16×32 and the coded block flag value for each of the two transforms is one, then a 16×16 inverse transform is selected for each of the 16×16 regions resulting from the inferred split.

An apply inverse transform step 1110 then performs the inverse transform for each of the maximum number of transforms regions on the corresponding region having a coded block flag value of one. This results in a conversion of each chroma residual coefficient array (frequency domain representation) into a chroma residual sample array (spatial domain representation) representative of the decoded video frame. The apply inverse transform step 1110 is generally performed by the inverse scale and transform module 422.

Figure 12A:
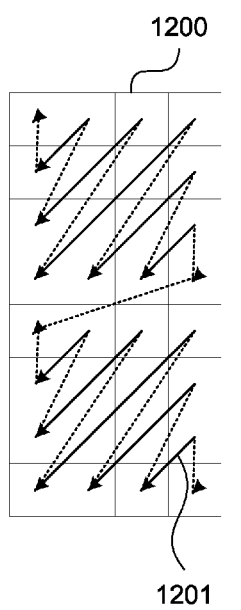
FIGS. 12A to 12C schematically show residual scan patterns of a 4×8 transform unit.
Figure 12B:
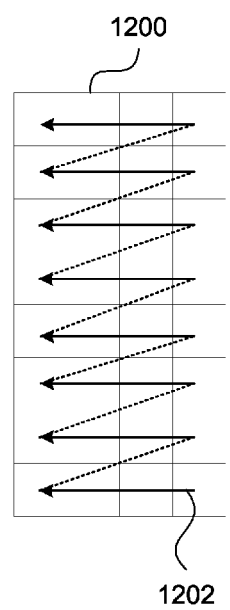
Figure 12C:
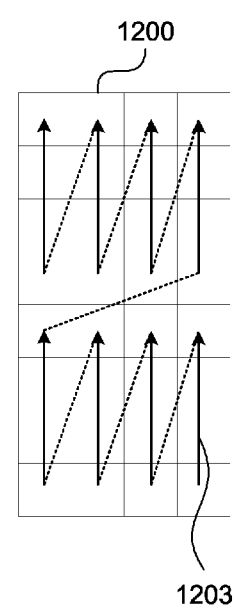

FIG. 12A shows a diagonal scan pattern 1201, FIG. 12B shows a horizontal scan pattern 1202, and FIG. 12C shows a vertical scan pattern 1203, each for a 4×8 transform unit 1200. Those implementations that scan the 4×8 transform unit 1200 using the illustrated scan patterns have the property that the residual coefficients are grouped in 4×4 blocks, known as 'sub-blocks'. A 'coefficient group' flag present in the encoded bitstream 312 may therefore be used to indicate, for each sub-block, the presence of at least one significant (non-zero) residual coefficient. Applying a 4×4 sub-block size for the 4×8 transform achieves consistency with the scan pattern present in other transform sizes, where coefficients are always grouped into sub-blocks.

Particular implementations may apply a coefficient group flag to signal the presence of at least one non-zero residual coefficient in each sub-block. Advantageously, these scan patterns permit re-use of control software or digital circuitry that processes residual coefficients, by reusing the sub-block processing for all transform sizes. The particular scan pattern used may be selected according to criteria such as the intra-prediction direction of the collocated prediction unit (PU). Where a transform encodes chroma samples on a 4:2:2 chroma format sample grid, the relationship between the intra-prediction direction and the scan pattern is altered because each chroma sample maps to a non-square (2×1) array of luma samples, affecting the 'direction' or angle of the intra-prediction mode. Scanning is shown in a 'backward' direction, ending at the DC coefficient, located in the top-left corner of the transform unit (TU). Further, scanning is not required to start at the lower-right corner of the transform unit (TU). Due to the predominance of nonzero residual coefficients in the upper left region of the transform unit (TU), scanning may begin from a 'last significant coefficient position' and progress in a backward direction until the upper left coefficient is reached.

Other implementations may apply a single scan to a given region to encode residual coefficients and then apply more than one transform to these residual coefficients. In this case only one coded block flag is used for the region and therefore for all transforms covered by the scan pattern. The coded block flag is set to one if at least one significant residual coefficient exists in any of the scans. For example, the 4×8 scan patterns of FIGS. 12A-12C may be applied to encode residual coefficients of two 4×4 transforms. The two 4×4 arrays of residual coefficients may be concatenated to form a 4×8 array suitable for the scan pattern. As a single scan is performed over the array, a single 'last significant coefficient' position is encoded in the bitstream for the scan pattern and a single coded block flag value is sufficient for the array. The energy compaction property of the modified discrete cosine transform (DCT) gives advantage to other schemes, such as interleaving the coefficients of each square transform along the path of the scan pattern into the rectangular coefficient array. This gives the advantage the density of residual coefficient values in each 4×4 residual coefficient array is approximately equalised in the combined 4×8 array, allowing higher compression efficiency to be created by the entropy encoder 324, for subsequent decoding by the entropy decoder 420.

Certain implementations encoding chroma colour channels may use a first transform to encode residual samples at chroma sample locations corresponding to a 4:2:0 chroma sample grid and a second transform to encode residual samples at the additional chroma sample locations introduced in the 4:2:2 chroma sample grid, relative to the 4:2:0 chroma sample grid. Such implementations may advantageously use a simplified transform for the second transform, such as a Hadamard transform with the output of the second transform being added (or otherwise combined) to the residual samples for the first transform to produce the residual samples for the second transform. Advantageously a preprocessing stage implementing a transform such as a Haar transform may be used to sample the chroma sample grid for a 4:2:2 chroma format into the chroma sample grid for a 4:2:0 chroma format. Such configurations must transmit additional residual coefficients from the preprocessing stage as side-information, such a residual applied to each largest coding unit (LCU) in the case that the preprocessing transform is applied at the largest coding unit (LCU) level.

Implementations having multiple transforms for a given region may use either a single combined scan covering the entire region, or a separate scan for each transform. If the scanning for the multiple transforms is combined into a single scan, then only one coded block flag is required for each region being scanned. Those implementations using a single combined scan may achieve higher compression of the residual coefficients by interleaving the residual coefficients of each transform, such as interleaving on a coefficient-by-coefficient basis, in order to collocate residual coefficients from each transform having similar spectral properties.

Appendix A illustrates possible 'text' for the high efficiency video coding (HEVC) standard under development that is relevant to the syntax structure 900 and the syntax structure 930. Each instance of a transform_tree( ) function in appendix A is depicted as a portion of the syntax structure labelled 'TT' in FIGS. 9A and 9C and each instance of a transform_unit( ) function in appendix A is depicted as a portion of the syntax structure labelled 'TU' in FIGS. 9A and 9B. The text provided in Appendix A is one example of text that accords with the syntax structures 900 and 930 and other examples are possible. Text that accords with the syntax structures 900 and 930 implies that the video encoder 114 performs the method 1000 to encode a bitstream and the video decoder 134 performs the method 1100 to decode the bitstream.

Appendix B illustrates possible text for the high efficiency video coding (HEVC) standard under development that is relevant to the syntax structure 9100 and the syntax structure 9130. Each instance of a transform_tree( ) function in appendix B is depicted as a portion of the syntax structure labelled 'TT' in FIGS. 9C and 9D and each instance of a transform_unit( ) function in appendix A is depicted as a portion of the syntax structure labelled 'TU' in FIGS. 9C and 9D. The text provided in Appendix B is one example of text that accords with the syntax structures 9100 and 9130 and other examples are possible. Text that accords with the syntax structures 9100 and 9130 also implies that the video encoder 114 performs the method 1000 to encode a bitstream and the video decoder 134 performs the method 1100 to decode the bitstream.

The text in Appendix A and Appendix B result in an implementation whereby the 32×32 chroma region encountered in a transform unit (TU) of size 32×32 configured for the 4:4:4 chroma format results in (a maximum number of) four 16×16 chroma transforms being applied, and the 16×32 chroma region encountered in a transform unit (TU) of size 32×32 configured for the 4:2:2 chroma format results in (a maximum number of) two 16×16 chroma transforms being applied. The implementation resulting from the text in Appendix A and Appendix B, when applied to transform units (TUs) of smaller size and configured for the 4:2:2 chroma format, (a maximum of) one chroma transforms is applied. For example, an 8×16 transform is applied to an 8×16 chroma region and a 4×8 transform is applied to a 4×8 chroma region.

INDUSTRIAL APPLICABILITY

The arrangements described are applicable to the computer and data processing industries and particularly for the digital signal processing for the encoding a decoding of signals such as video signals.

The foregoing describes only some embodiments of the present invention, and modifications and/or changes can be made thereto without departing from the scope and spirit of the invention, the embodiments being illustrative and not restrictive.

(Australia only) In the context of this specification, the word "comprising" means "including principally but not necessarily solely" or "having" or "including", and not "consisting only of". Variations of the word "comprising", such as "comprise" and "comprises" have correspondingly varied meanings.

APPENDIX A

TRANSFORM_TREE( ) AND TRANSFORM_UNIT( ) IMPLEMENT THE INFERRED CHROMA SPLIT USING A LOOP CONSTRUCT 7.3.11 Transform tree syntax

| | Descriptor |
|---|---|
| transform_tree( x0, y0, xBase, yBase, log2TrafoSize, trafoDepth, blkIdx ) { | |
|   if( log2TrafoSize <= Log2MaxTrafoSize && | |
|     log2TrafoSize > Log2MinTrafoSize && | |
|     trafoDepth < MaxTrafoDepth && !(IntraSplitFlag && trafoDepth = = 0) ) | |
|     split_transform_flag[ x0 ][ y0 ][ trafoDepth ] | ae(v) |
|   if( trafoDepth = = 0 \|\| log2TrafoSize > 2 ) { | |
|     if( trafoDepth = = 0 \|\| cbf_cb[ xBase ][ yBase ][ trafoDepth − 1 ] ) { | |
|       for( tIdx = 0; tIdx < TrafoCrCbCnt; tIdx++ ) { | |
|         cbf_cb[ x0 + ( ( 1 << log2CrCbTrafoHorSize ) * (tIdx mod TrafoCrCbHorCnt) )][ y0 + ( 1 << log2CrCbTrafoVertSize ) * ( tIdx div TrafoCrCbVertCnt) ) ][ trafoDepth + (TrafoCrCbCnt > 1) ] | ae(v) |
|       } | |
|       cbf_cb[ x0 ][ y0 ][ trafoDepth ] \|= (TrafoCrCbCnt > 1) | |
|     } | |
|     if( trafoDepth = = 0 \|\| cbf_cr[ xBase ][ yBase ][ trafoDepth − 1 ] ) { | |
|       for( tIdx = 0; tIdx < TrafoCrCbCnt; tIdx++ ) { | |
|         cbf_cr[ x0 + ( ( 1 << log2CrCbTrafoHorSize ) * (tIdx mod TrafoCrCbHorCnt) )][ y0 + ( 1 << log2CrCbTrafoVertSize ) * (tIdx div TrafoCrCbVertCnt) ) ][ trafoDepth + (TrafoCrCbCnt > 1) ] | ae(v) |
|       } | |
|       cbf_cr[ x0 ][ y0 ][ trafoDepth ] \|= (TrafoCrCbCnt > 1) | |
|     } | |
|   } | |
|   if( split_transform_flag[ x0 ][ y0 ][ trafoDepth ] ) { | |
|     x1 = x0 + ( ( 1 << log2TrafoSize ) >> 1 ) | |
|     y1 = y0 + ( ( 1 << log2TrafoSize ) >> 1 ) | |
|     transform_tree( x0, y0, x0, y0, log2TrafoSize − 1, trafoDepth + 1, 0 ) | |
|     transform_tree( x1, y0, x0, y0, log2TrafoSize − 1 trafoDepth + 1, 1 ) | |
|     transform_tree( x0, y1, x0, y0, log2TrafoSize − 1, trafoDepth + 1, 2 ) | |
|     transform_tree( x1, y1, x0, y0, log2TrafoSize − 1, trafoDepth + 1, 3 ) | |

APPENDIX A-continued

TRANSFORM_TREE( ) AND TRANSFORM_UNIT( ) IMPLEMENT THE
INFERRED CHROMA SPLIT USING A LOOP CONSTRUCT

```
    } else {
        if(PredMode[ x0 ][ y0 ] = = MODE_INTRA || trafoDepth != 0 ||
                cbf_cb[ x0 ][ y0 ][ trafoDepth ] || cbf_cr[ x0 ][ y0 ][ trafoDepth ] )
            cbf_luma[ x0 ][ y0 ][ trafoDepth ]                                          ae(v)
        transform_unit (x0, y0, xBase, yBase, log2TrafoSize, trafoDepth, blkIdx)
    }
}
```

7.3.12 Transform unit syntax

| | Descriptor |
|---|---|

```
transform_unit( x0, y0, xBase, yBase, log2TrafoSize, trafoDepth, blkIdx ) {
    if( cbf_luma[ x0 ][ y0 ][ trafoDepth ] || cbf_cb[ x0 ][ y0 ][ trafoDepth ] ||
            cbf_cr[ x0 ][ y0 ][ trafoDepth ] ) {
        if( cu_qp_delta_enabled_flag && !IsCuQpDeltaCoded ) {
            cu_qp_delta_abs                                                             ae(v)
            if( cu_qp_delta_abs )
                cu_qp_delta_sign                                                        ae(v)
        }
        if( cbf_luma[ x0 ][ y0 ][ trafoDepth ] )
            residual_coding( x0, y0, log2TrafoSize, 0 )
        if( log2TrafoSize > 2 ) {
            if( cbf_cb[ x0 ][ y0 ][ trafoDepth ] )
                for ( tIdx = 0; tIdx < TrafoCrCbCnt; tIdx++ ) {
                    residual_coding( x0 + ( ( 1 << log2CrCbTrafoHorSize ) * (tIdx mod
TrafoCrCbHorCnt), y0 + ( 1 << log2CrCbTrafoVertSize ) * (tIdx div
TrafoCrCbVertCnt) ), log2TrafoSize, 1 )
                }
            if( cbf_cr[ x0 ][ y0 ][ trafoDepth ] )
                for ( tIdx = 0; tIdx < TrafoCrCbCnt; tIdx++ ) {
                    residual_coding( x0 + ( ( 1 << log2CrCbTrafoHorSize ) * (tIdx mod
TrafoCrCbHorCnt), y0 + ( 1 << log2CrCbTrafoVertSize ) * (tIdx div
TrafoCrCbVertCnt) ), log2TrafoSize, 2 )
                }
        } else if( blkIdx = = 3 ) {
            if( cbf_cb[ xBase ][ yBase ][ trafoDepth ] )
                residual_coding( xBase, yBase, log2TrafoSize, 1 )
            if( cbf_cr[ xBase ][ yBase ][ trafoDepth ] )
                residual_coding( xBase, yBase, log2TrafoSize, 2 )
        }
    }
}
```

7.4.8.1 General coding unit semantics

The variables TrafoCrCbHorCnt and TrafoCrCbVertCnt are derived as follows:
    - If log2TrafoSize is equal to 5 and split_transform_flag is equal to 0,
TransformIdxMax is derived as follows:
        - If chroma_format_idc is equal to 1, TrafoCrCbHorCnt and
TrafoCrCbVertCnt are equal to 1.
        - If chroma_format_idc is equal to 2, TrafoCrCbHorCnt is equal to 1 and
TrafoCrCbVertCnt is equal to 2.
        - Otherwise, if chroma_format_idc is equal to 3, TrafoCrCbHorCnt and
TrafoCrCbVertCnt are equal to 2.
    - Otherwise, TrafoCrCbHorCnt and TrafoCrCbVertCnt are equal to 1.
The variable TrafoCrCbCnt is derived as TrafoCrCbHorCnt * TrafoCrCbVertCnt.
The variables log2CrCbTrafoHorSize and log2CrCbTrafoVertSize are derived as follows:
    - If chroma_format_idc is equal to 1, log2CrCbTrafoHorSize and
log2CrCbTrafoVertSize are equal to log2TrafoSize − 1.
    - Otherwise, if chroma_format_idc is equal to 2, log2CrCbTrafoHorSize is equal
to log2TrafoSize and log2CrCbTrafoVertSize is equal to min(log2TrafoSize − 1, 4).
    - Otherwise, if chroma_format_idc is equal to 3, log2CrCbTrafoHorSize and
log2CrCbTrafoVertSize are equal to min(log2TrafoSize, 4).

End Appendix A

APPENDIX B

INVOKE TRANSFORM_TREE( ) ONCE PER PAIR OF CHROMA CHANNELS
FOR EACH CHROMA TRANSFORM RESULTING FROM THE INFERRED SPLIT.

| 7.3.11 Transform tree syntax | |
|---|---|
| | Descriptor |

```
transform_tree( x0, y0, xBase, yBase, log2TrafoSize, trafoDepth, blkIdx,
chromaOnly ) {
    if( log2TrafoSize <= Log2MaxTrafoSize &&
        log2TrafoSize > Log2MinTrafoSize &&
        trafoDepth < MaxTrafoDepth && !(IntraSplitFlag && trafoDepth = = 0)
        && !chromaOnly )
        split_transform_flag[ x0 ][ y0 ][ trafoDepth ]                              ae(v)
    if( trafoDepth = = 0 || log2TrafoSize > 2 ) {
        if( trafoDepth = = 0 || cbf_cb[ xBase ][ yBase ][ trafoDepth − 1 ] )
            if( TrafoCrCbCnt > 1 ) {
                cbf_cb[ x0 ][ y0 ][ trafoDepth ] = 1
            } else {
                cbf_cb[ x0 ][ y0 ][ trafoDepth ]                                    ae(v)
            }
        if( trafoDepth = = 0 || cbf_cr[ xBase ][ yBase ][ trafoDepth − 1 ] )
            if( TrafoCrCbCnt > 1 ) {
                cbf_cr[ x0 ] [ y0 ][ trafoDepth ] = 1
            } else {
                cbf_cr[ x0 ][ y0 ][ trafoDepth ]                                    ae(v)
            }
    }
    if( split_transform_flag[ x0 ][ y0 ][ trafoDepth ] || TrafoCrCbCnt > 1 ) {
        x1 = x0 + ( ( 1 << log2TrafoSize ) >> 1 )
        y1 = y0 + ( ( 1 << log2TrafoSize ) >> 1 )
        transform_tree( x0, y0, x0, y0, log2TrafoSize − 1, trafoDepth + 1, 0,
TrafoCrCbCnt > 1 )
        if( chroma_format_idc != 2 ) {
            transform_tree( x1, y0, x0, y0, log2TrafoSize − 1 trafoDepth + 1, 1,
TrafoCrCbCnt > 1 )
        }
        transform_tree( x0, y1, x0, y0, log2TrafoSize − 1, trafoDepth + 1, 2,
TrafoCrCbCnt > 1 )
        if( chroma_format_idc != 2 ) {
            transform_tree( x1, y1, x0, y0, log2TrafoSize − 1, trafoDepth + 1, 3,
TrafoCrCbCnt > 1 )
        }
    }
    if( !split_transform_flag[ x0 ][ y0 ][ trafoDepth ] && TrafoCrCbCnt > 1 ) {
        if( ( PredMode[ x0 ][ y0 ] = = MODE_INTRA || trafoDepth != 0 ||
            cbf_cb[ x0 ][ y0 ][ trafoDepth ] || cbf_cr[ x0 ][ y0 ][ trafoDepth ] ) &&
!chromaOnly)
            cbf_luma[ x0 ][ y0 ][ trafoDepth ]                                      ae(v)
        transform_unit (x0, y0, xBase, yBase, log2TrafoSize, trafoDepth, blkIdx,
chromaOnly )
    }
}
```

| 7.3.12 Transform unit syntax | |
|---|---|
| | Descriptor |

```
transform_unit( x0, y0, xBase, yBase, log2TrafoSize, trafoDepth, blkIdx,
chromaOnly ) {
    if( cbf_luma[ x0 ][ y0 ][ trafoDepth ] || cbf_cb[ x0 ][ y0 ][ trafoDepth ] ||
        cbf_cr[ x0 ][ y0 ][ trafoDepth ] ) {
        if( cu_qp_delta_enabled_flag && !IsCuQpDeltaCoded && !chromaOnly ) {
            cu_qp_delta_abs                                                         ae(v)
            if( cu_qp_delta_abs )
                cu_qp_delta_sign                                                    ae(v)
        }
        if( cbf_luma[ x0 ][ y0 ][ trafoDepth ] )
            residual_coding( x0, y0, log2TrafoSize, 0 )
        if( log2TrafoSize > 2 ) {
            if( cbf_cb[ x0 ][ y0 ][ trafoDepth ] )
                for ( tIdx = 0; tIdx < TrafoCrCbCnt; tIdx++ ) {
                    residual_coding( x0, y0, log2TrafoSize, 1 )
            if( cbf_cr[ x0 ][ y0 ][ trafoDepth ] )
                for ( tIdx = 0; tIdx < TrafoCrCbCnt; tIdx++ ) {
                    residual_coding( x0, , log2TrafoSize, 2 )
        } else if( blkIdx = = 3 ) {
            if( cbf_cb[ xBase ][ yBase ][ trafoDepth ] )
                residual_coding( xBase, yBase, log2TrafoSize, 1 )
            if( cbf_cr[ xBase ][ yBase ][ trafoDepth ] )
```

APPENDIX B-continued

```
        INVOKE TRANSFORM_TREE( ) ONCE PER PAIR OF CHROMA CHANNELS
        FOR EACH CHROMA TRANSFORM RESULTING FROM THE INFERRED SPLIT.

residual_coding( xBase, yBase, log2TrafoSize, 2 )
            }
        }
    }
}
```

7.4.8.1 General coding unit semantics

The variables TrafoCrCbHorCnt and TrafoCrCbVertCnt are derived as follows:
- If log2TrafoSize is equal to 5 and split_transform_flag is equal to 0,
TransformIdxMax is derived as follows:
  - If chroma_format_idc is equal to 1, TrafoCrCbHorCnt and TrafoCrCbVertCnt
    are equal to 1.
  - If chroma_format_idc is equal to 2, TrafoCrCbHorCnt is equal to 1 and
    TrafoCrCbVertCnt is equal to 2.
  - Otherwise, if chroma_format_idc is equal to 3, TrafoCrCbHorCnt and
    TrafoCrCbVertCnt are equal to 2.
- Otherwise, TrafoCrCbHorCnt and TrafoCrCbVertCnt are equal to 1.
The variable TrafoCrCbCnt is derived as TrafoCrCbHorCnt * TrafoCrCbVertCnt.

End of Appendix B

The invention claimed is:

1. A method of decoding a transform unit containing chroma residual samples from a video bitstream, the transform unit containing a plurality of chroma residual coefficient arrays associated with a single chroma channel in a 4:2:2 chroma format, the method comprising:
   decoding a plurality of coded block flag values from the video bitstream for a single chroma channel of the transform unit, wherein the transform unit has a plurality of chroma residual coefficient arrays for a single colour channel and each coded block flag value of the plurality of coded block flag values corresponds to one chroma residual coefficient array of the chroma residual coefficient arrays;
   decoding from the video bitstream each of a plurality of chroma residual coefficient arrays according to a corresponding coded block flag value of the plurality of coding block flag values;
   selecting a square inverse transform for the decoded chroma residual coefficient arrays, the square inverse transform being selected from a predetermined set of square inverse transforms according to a transform size of the transform unit; and
   applying the selected square inverse transform to each of the decoded chroma residual coefficient arrays to produce the chroma residual samples for the chroma channel of the transform unit.

2. A method according to claim 1 wherein a coded block flag value of zero indicates all residual coefficients of the corresponding residual coefficient array are zero and a coded block flag value of one indicates at least one residual coefficient of the corresponding residual coefficient array is nonzero.

3. A method according to claim 1 wherein the transform size is one of 32×32, 16×16, 8×8 or 4×4.

4. A method according to claim 1 wherein there are two chroma residual coefficient arrays for a single colour channel and two coded block flag values are decoded from the video bitstream for a single colour channel.

5. A method of encoding a transform unit containing chroma residual samples to a video bitstream, the transform unit containing a plurality of chroma residual coefficient arrays associated with a single chroma channel in a 4:2:2 chroma format, the method comprising:
   encoding a plurality of coded block flag values to the video bitstream for a single chroma channel of the transform unit, wherein the transform unit has a plurality of chroma residual coefficient arrays for a single colour channel and each coded block flag value of the plurality of coded block flag values corresponds to one chroma residual coefficient array of the chroma residual coefficient arrays;
   selecting a square forward transform for the chroma residual coefficient arrays, the square forward transform being selected from a predetermined set of square forward transforms according to a transform size of the transform unit;
   applying the selected square forward transform to each of the chroma residual coefficient arrays to produce the chroma residual samples for the chroma channel of the transform unit; and
   encoding to the video bitstream each of the plurality of chroma residual coefficient arrays according to a corresponding coded block flag value of the plurality of coding block flag values.

6. A method according to claim 5 wherein a coded block flag value of zero indicates all residual coefficients of the corresponding residual coefficient array are zero and a coded block flag value of one indicates at least one residual coefficient of the corresponding residual coefficient array is nonzero.

7. A method according to claim 5 wherein the transform size is one of 32×32, 16×16, 8×8 or 4×4.

8. A method according to claim 5 wherein there are two chroma residual coefficient arrays for a single colour channel and two coded block flag values are encoded to the video bitstream for a single colour channel.

9. A video decoder for decoding a transform unit containing chroma residual samples from a video bitstream, the transform unit containing a plurality of chroma residual coefficient arrays associated with a single chroma channel in a 4:2:2 chroma format, the decoder comprising:
   a first decoder to decoding a plurality of coded block flag values from the video bitstream for a single chroma channel of the transform unit, wherein the transform unit has a plurality of chroma residual coefficient arrays for a single colour channel and each coded block flag value of the plurality of coded block flag values corresponds to one chroma residual coefficient array of the chroma residual coefficient arrays;

a second decoder to decode from the video bitstream each of a plurality of chroma residual coefficient arrays according to a corresponding coded block flag value of the plurality of coding block flag values;

a selector to select a square inverse transform for the decoded chroma residual coefficient arrays, the square inverse transform being selected from a predetermined set of square inverse transforms according to a determined transform size of the transform unit; and an applicator to apply the selected square inverse transform to each of the decoded chroma residual coefficient arrays to produce the chroma residual samples for the chroma channel of the transform unit.

10. A decoder according to claim 9 wherein a coded block flag value of zero indicates all residual coefficients of the corresponding residual coefficient array are zero and a coded block flag value of one indicates at least one residual coefficient of the corresponding residual coefficient array is nonzero.

11. A decoder according to claim 9 wherein the transform size is one of 32×32, 16×16, 8×8 or 4×4.

12. A decoder according to claim 9 wherein there are two chroma residual coefficient arrays for a single colour channel and two coded block flag values are decoded from the video bitstream for a single colour channel.

13. A non-transitory computer readable storage medium having a program recorded thereon, the program being executable by a processor to decode a transform unit containing chroma residual samples from a video bitstream, the transform unit containing a plurality of chroma residual coefficient arrays associated with a single chroma channel in a 4:2:2 chroma format, the program comprising:

code for decoding a plurality of coded block flag values from the video bitstream for a single chroma channel of the transform unit, wherein the transform unit has a plurality of chroma residual coefficient arrays for a single colour channel and each coded block flag value of the plurality of coded block flag values corresponds to one chroma residual coefficient array of the chroma residual coefficient arrays;

code for decoding from the video bitstream each of a plurality of chroma residual coefficient arrays according to a corresponding coded block flag value of the plurality of coding block flag values;

code for selecting a square inverse transform for the decoded chroma residual coefficient arrays, the square inverse transform being selected from a predetermined set of square inverse transforms according to a transform size of the transform unit; and code for applying the selected square inverse transform to each of the decoded chroma residual coefficient arrays to produce the chroma residual samples for the chroma channel of the transform unit.

14. A non-transitory computer readable storage medium according to claim 13 wherein a coded block flag value of zero indicates all residual coefficients of the corresponding residual coefficient array are zero and a coded block flag value of one indicates at least one residual coefficient of the corresponding residual coefficient array is nonzero.

15. A non-transitory computer readable storage medium according to claim 13 wherein the transform size is one of 32×32, 16×16, 8×8 or 4×4.

16. A non-transitory computer readable storage medium according to claim 13 wherein there are two chroma residual coefficient arrays for a single colour channel and two coded block flag values are decoded from the video bitstream for a single colour channel.

17. A video encoder to encode a transform unit containing chroma residual samples to a video bitstream, the transform unit containing a plurality of chroma residual coefficient arrays associated with a single chroma channel in a 4:2:2 chroma format, the encoder comprising:

a first encoder to encode a plurality of coded block flag values to the video bitstream for a single chroma channel of the transform unit, wherein the transform unit has a plurality of chroma residual coefficient arrays for a single colour channel and each coded block flag value of the plurality of coded block flag values corresponds to one chroma residual coefficient array of the chroma residual coefficient arrays;

a selector to select a square forward transform for the chroma residual coefficient arrays, the square forward transform being selected from a predetermined set of square forward transforms according to a transform size of the transform unit;

an applicator to apply the selected square forward transform to each of the chroma residual coefficient arrays to produce the chroma residual samples for the chroma channel of the transform unit; and a second encoder to encode to the video bitstream each of the plurality of chroma residual coefficient arrays according to a corresponding coded block flag value of the plurality of coding block flag values.

18. A non-transitory computer readable storage medium having a program recorded thereon, the program being executable by a processor to encode a transform unit containing chroma residual samples to a video bitstream, the transform unit containing a plurality of chroma residual coefficient arrays associated with a single chroma channel in a 4:2:2 chroma format, the program comprising:

code for encoding a plurality of coded block flag values to the video bitstream for a single chroma channel of the transform unit, wherein the transform unit has a plurality of chroma residual coefficient arrays for a single colour channel and each coded block flag value of the plurality of coded block flag values corresponds to one chroma residual coefficient array of the chroma residual coefficient arrays;

code for selecting a square forward transform for the chroma residual coefficient arrays, the square forward transform being selected from a predetermined set of square forward transforms according to a transform size of the transform unit;

code for applying the selected square forward transform to each of the chroma residual coefficient arrays to produce the chroma residual samples for the chroma channel of the transform unit; and code for encoding to the video bitstream each of the plurality of chroma residual coefficient arrays according to a corresponding coded block flag value of the plurality of coding block flag values.

19. A non-transitory computer readable storage medium according to claim 18 wherein a coded block flag value of zero indicates all residual coefficients of the corresponding residual coefficient array are zero and a coded block flag value of one indicates at least one residual coefficient of the corresponding residual coefficient array is nonzero.

20. A non-transitory computer readable storage medium according to claim 18 wherein there are two chroma residual coefficient arrays for a single colour channel and two coded block flag values are decoded from the video bitstream for a single colour channel.

* * * * *